United States Patent
Tu et al.

(10) Patent No.: US 8,436,106 B2
(45) Date of Patent: *May 7, 2013

(54) CROSSLINKERS AND MATERIALS PRODUCED USING THEM

(75) Inventors: Huilin Tu, Cambridge, MA (US); Agathe Robisson, Cambridge, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 923 days.

This patent is subject to a terminal disclaimer.

(21) Appl. No.: 12/179,135

(22) Filed: Jul. 24, 2008

(65) Prior Publication Data

US 2010/0022718 A1    Jan. 28, 2010

(51) Int. Cl.
  *C08G 65/00*   (2006.01)
  *C08G 65/48*   (2006.01)
  *C08G 2/30*    (2006.01)
  *C08G 16/00*   (2006.01)

(52) U.S. Cl.
  USPC ............ 525/471; 525/50; 525/521; 525/534; 528/125; 528/220; 528/229; 528/492

(58) Field of Classification Search .............. 525/50, 525/471, 521, 534; 528/125, 220, 229, 492
  See application file for complete search history.

(56) References Cited

U.S. PATENT DOCUMENTS

| | | | |
|---|---|---|---|
| 2,659,712 A * | 11/1953 | Thompson et al. | ........... 528/228 |
| 4,678,709 A | 7/1987 | Tondre | |
| 4,808,699 A | 2/1989 | van Broekhoven et al. | |
| 4,868,282 A | 9/1989 | van Broekhoven et al. | |
| 5,284,728 A | 2/1994 | Murayama | |
| 7,144,665 B2 | 12/2006 | Tokarski | |
| 7,179,574 B2 | 2/2007 | Jubran | |

FOREIGN PATENT DOCUMENTS

| | | |
|---|---|---|
| EP | 0204520 | 4/1992 |
| WO | 2006119041 | 11/2006 |

OTHER PUBLICATIONS

Thompson et al., J. Applied Polymer Science 36 (1988) 1113-1120.*
Lyle et al., ACS Polym. Prep. 28 (1987) 77-79.*
U.S. Dept. Health and Human Services, Occupational Safety and Health Guideline for Benzidine, 1995, 1-7.*
Chan, et al "Crosslinking of poly(arylene ether ketone)s 1. Rheological behavoir of the melt and mechanical properties of cured resin", Journal of Applied Polymer Science, vol. 32 pp. 5933-5943 (1986).
Thompson, et al "A novel method for crosslinking polyetheretherketone" Journal of Applied Polymer Science, vol. 36, pp. 1113-1120 (1988).
Yurchenko, et al "Synthesis, mechanical properties and chemical/solvent resistance of crosslinked poly(aryl-ether-ether-ketones) at high temperatures" Polymer, www.elsevier.com/locate/polymer, 2010, 7 pages.
Extended European Search Report of European Application No. 09800925.1 (60.1806EP EPT) dated Oct. 18, 2012: pp. 1-8.
Tadmor et al., "Single Rotor Machines," Principles of Polymer Processing, Second Edition, John Wiley & Sons, Inc.: New Jersey, 2006: pp. 447-472.
Tadmor et al., "Twin Screw and Twin Rotor Processing Equipment," Principles of Polymer Processing, Second Edition, John Wiley & Sons, Inc.: New Jersey, 2006: pp. 523-532.
Walker et al., "Crosslinking chemistry high-performance polymer networks," Polymer, 1994, vol. 35(23): pp. 5012-5017.

* cited by examiner

*Primary Examiner* — Roberto Rabago
(74) *Attorney, Agent, or Firm* — Bridget Laffey; Jakub Michna; Rachel E. Greene

(57) ABSTRACT

Cross-linkers and polymers produced using them are provided. The cross-linked polymers are suitable for use in applications where a broad temperature range may be encountered. In some examples, at least a first and a second polyetheretherketone chain may be cross-linked to each other through two or more Schiff base linkages. Articles using the cross-linked polymers are also described.

10 Claims, 12 Drawing Sheets

TABLE 1

| STRUCTURE | NAME | MELTING POINT(°C) | BOILING POINT(°C) |
|---|---|---|---|
| H₂N—⟨⟩—NH₂ (LVXIII) | 4,4'-PHENYLENEDIAMINE | 141 | 267 |
| H₂N—⟨⟩—O—⟨⟩—NH₂ (LVXIX) | 4,4'-DIAMINODIPHENYL ETHER | 189 | >300 |
| H₂N—⟨⟩—S—⟨⟩—NH₂ (LVXX) | 4,4'-DIAMINODIPHENYL SULFIDE | 108.5 | >300 |
| H₂N—⟨⟩—SO₂—⟨⟩—NH₂ (LVXXI) | 4,4'-DIAMINODIPHENYL SULFONE | 175.5 | >300 |
| H₂N—⟨⟩—CH₂—⟨⟩—NH₂ (LVXXII) | 4,4'-DIAMINODIPHENYL METHANE | 92.5 | 398 (257 AT 18mm Hg) |
| H₂N—⟨⟩—CO—⟨⟩(NH₂) (LVXXII) | 3,3'-DIAMINOBENZOPHENONE | 173.5 | 285 AT 11mm Hg |
| H₂N—⟨⟩—⟨⟩—NH₂ (LVXXIII) | P-BENZIDINE | 120 | 401 |

FIG.8

CROSSLINKERS AND MATERIALS PRODUCED USING THEM

TECHNOLOGICAL FIELD

Examples disclosed herein relate generally to cross-linkers and polymers produced using them. More particularly, certain embodiments disclosed herein are directed to cross-linkers for use with polyetheretherketone such as, for example, cross-linkers that provide a cross-linked polyetheretherketone adapted for use in a high temperature environment.

BACKGROUND

In extraction of fuels from a potential fuel producing site, the components used to explore a well-bore and/or extract fuels may be exposed to a broad temperature and/or pressure range. In particular, significant temperature differences may be experienced by a device as it is lowered into a well-bore to a desired depth.

SUMMARY

In a first aspect, a polymer comprising a plurality of polyetheretherketone chains, wherein a first and a second polyetheretherketone chain are cross-linked to each other is provided. In some examples, the polyetheretherketone chains may be cross-linked to provide a polymer having formula (I).

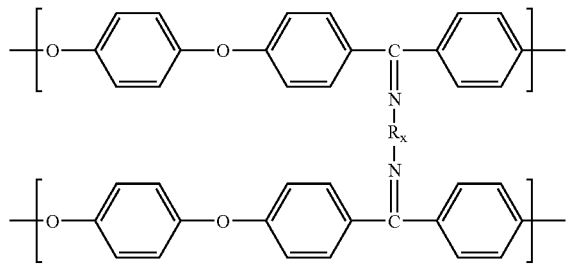

(I)

In certain examples, the polyetheretherketone chains may be linked, for example, through a N—$R_X$—N group as shown in formula (I). In certain embodiments, one of the nitrogen groups of the N—$R_X$—N group may be bound to a carbon of the first polyetheretherketone chain through a first carbon-nitrogen double bond and the other nitrogen of the N—$R_X$—N group may be bound to a carbon of the second polyetheretherketone chain through a second carbon-nitrogen double bond. In some examples, the N—$R_X$—N group is provided from a cross-linker having formulae (II)-(V) as described herein.

In certain embodiments, the cross-linker may be a derivatized PEEK comprising two terminal amino groups. In other embodiments, the cross-linker may be a derivatized PEEK comprising at least two side chain amino group. In some examples, the cross-linker may be a derivatized fiber comprising at least two amino groups or a derivatized particle comprising at least two amino groups. In some embodiments, the cross-linker may be a symmetric or an asymmetric diamine. In yet other examples, the $R_X$ group may be a compound having formulae (XVIII)-(XXVII) or (XXXVIII)-(XXXXIII), as described below and shown in the figures. In additional examples, the cross-linker may be a compound having formula (XXVIII)-(XXXVII) or (XXXXIV)-(LXII).

In certain examples, at least one of the plurality of polyetheretherketone chains may be cross-linked to an additional polymer chain through a Schiff base linkage.

In an additional aspect, a polymer comprising a formula of $(P_1)_m$-N—$R_X$—N-$(P_2)_n$ is provided. In certain examples, $P_1$ and $P_2$ are each polymeric chains, and m and n may independently vary from about 10 to about 1000. In some examples, one of the nitrogen groups of the N—$R_X$—N group may be bound to a carbon of the $P_1$ polymeric chain through a first carbon-nitrogen double bond and the other nitrogen of the N—$R_X$—N group may be bound to a carbon of the $P_2$ polymeric chain through a second carbon-nitrogen double bond. In some examples, the N—$R_X$—N group may be provided from a cross-linker having formula (II)-(V).

In certain embodiments, each of $P_1$ and $P_2$ may be a polyketone polymer. In some embodiments, the polyketone polymer may be polyetheretherketone. In yet other examples, the N—$R_X$—N group may be provided from a cross-linker that is a derivatized PEEK comprising two terminal amino groups. In some examples, the N—$R_X$—N group may be provided by a cross-linker that is a derivatized PEEK comprising at least two side chain amino groups. In other examples, the N—$R_X$—N group may be provided by a cross-linker that is a derivatized fiber comprising at least two amino groups or a derivatized particle comprising at least two amino groups In yet additional examples, the N—$R_X$—N may be provided by a cross-linker that is a derivatized fiber comprising at least two amino groups or a derivatized particle comprising at least two amino groups. In some examples, the $R_X$ group may be a compound having formulae (XVIII)-(XXVII) or (XXXVIII)-(XXXXIII).

In another aspect, a method comprising combining a polymer and at least one cross-linker having formulae (I)-(V) and a boiling point of 300° C. or more, and processing the combined polymer and cross-linker at a processing temperature to permit cross-linking of the polymer through formation of at least two Schiff base linkages between polymer chains of the polymer and the cross-linker is provided.

In certain embodiments, the method may further comprise selecting the cross-linker as a derivatized PEEK comprising two terminal amino groups. In some examples, the method may further comprise selecting the cross-linker as a derivatized PEEK comprising two side chain amino groups. In other examples, the method may further comprise selecting the cross-linker as a derivatized fiber comprising at least two amino groups or as a derivatized particle comprising at least two amino groups. In some examples, the method may further comprise comprising configuring the polymer with at least two polyetheretherketone chains cross-linked through the at least two Schiff base linkages.

In an additional aspect, a down-hole device comprising a surface exposed to an oilfield environment is disclosed. In certain examples, the surface comprises cross-linked polyketone chains cross-linked to each other through a N—$R_X$—N group, wherein one of the nitrogen groups of the N—$R_X$—N group is bound to a carbon of a first polyketone chain through a first carbon-nitrogen double bond and the other nitrogen of the N—$R_X$—N group is bound to a carbon of a second polyketone chain through a second carbon-nitrogen double bond, and wherein the N—$R_X$—N group is provided from a cross-linker having formulae (II)-(V).

In certain embodiments, down-hole device may be an electrical pad, a cable, a feed-through connector, a housing of an electrical or chemical device, a valve, a pump, a seal or an o-ring. In other embodiments, the electrical or chemical device may be a gas chromatograph, a liquid chromatograph, a mass spectrometer, a nuclear magnetic resonance device, a resistivity scanner, and a formation imager.

Additional aspects, examples, features and embodiments of the technology will be apparent to the person of ordinary skill in the art, given the benefit of the instant specification.

BRIEF DESCRIPTION OF THE FIGURES

Certain features, aspect and examples are described in more detail below with reference to the accompanying figures in which:

FIG. 8 includes Table I, which lists illustrative cross-linkers and their melting and boiling points, in accordance with certain examples;

Figure 1:
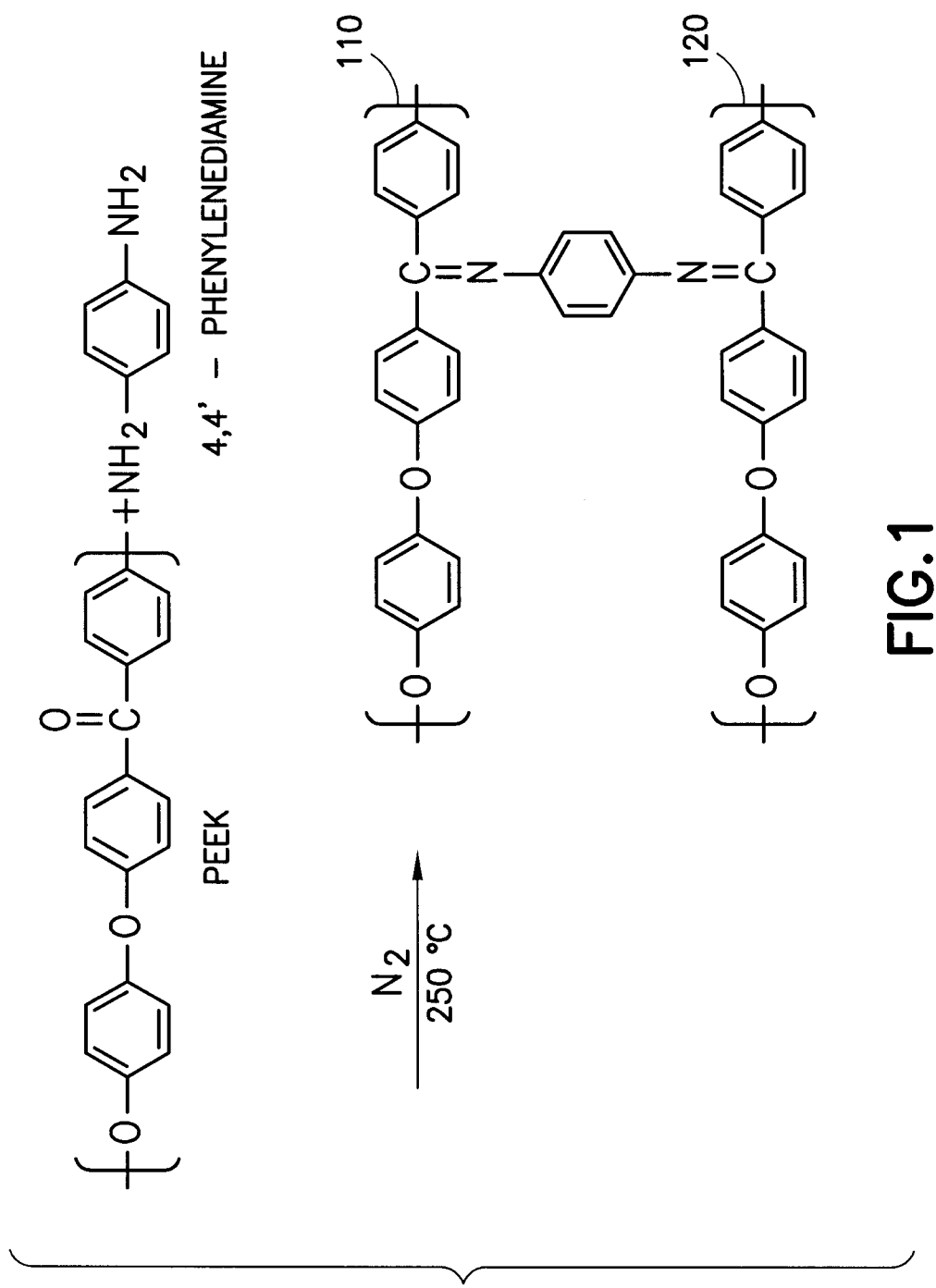
FIG. 1 is a general reaction scheme of a polyetheretherketone with 4,4'-phenylene diamine, in accordance with certain examples.

It will be recognized by the person of ordinary skill in the art, given the benefit of this disclosure, that the compounds shown in the figures and used throughout the text may be shown with disproportionate bond lengths, bond angles and the like to facilitate a better understanding of the technology described herein. Unless otherwise specified, no particular stereochemistry is implied in the illustrative chemical compounds drawn and described herein.

DETAILED DESCRIPTION

Certain examples described herein provide significant advantages over existing polymeric materials including, but not limited to, high temperature and high stress tolerances, and less creep in a use environment. These and other advantages will be recognized by the person of ordinary skill in the art, given the benefit of this disclosure.

Certain embodiments of the polymers produced using the cross-linkers disclosed herein may be used in numerous industrial, medical and mechanical applications, and are particularly suited for environments where high temperature, high pressure, aggressive chemicals and mechanical loads may be required or encountered. For example, certain embodiments of the cross-linked polymers may be particularly suited for use in the oil field service (OFS) industry such as, for example, the heavy oil market in: (1) structural component and insulation applications such as electrical pads and cables, feed-through, housing and packaging material of electrical and chemical devices, valves, pumps, etc; (2) elastomeric applications: o-rings and seals. In the OFS environment, the application temperatures may be well above 300° C., and embodiments of the polymers disclosed herein provide substantial performance advantages at temperatures above 300° C. than many existing polymers. Certain examples of the polymers may also be used in down-hole applications such as chemical, wear, and heat resistant piping, sleeves, wire and cable jacketing, coatings, connectors, liners, tubes and similar devices. In addition, the polymers disclosed herein have additional uses such as, for example, in snap fit parts, parts used in load bearing applications, heat shrinkable molded parts, and other parts used in the electrical, automotive, aerospace, medical industries and oil field service industries.

In certain embodiments, the polymers disclosed herein may be used by themselves or in combination with one or more other polymers, metals or non-metals, or structural components to provide an assembly configured for a desired use. These and other applications and uses of the materials described herein will be readily selected by the person of ordinary skill in the art, given the benefit of this disclosure.

In accordance with certain embodiments, a polymer comprising a general formula of $(P_1)_m$-X-$(P_2)_n$ is provided. In certain examples, $P_1$ represents a first polymer chain, $P_2$ represents a second polymer chain, and the two chains are cross-linked through the X group, which is provided from one or more of the illustrative cross-linkers described herein. The cross-linker X typically includes at least two amino groups which can react with the polymer chains to provide two or more Schiff base linkages between the polymer chains. For example, where the polymeric chains are both a polyketone, the resulting polymer may have a general formula as shown in formula (I) below.

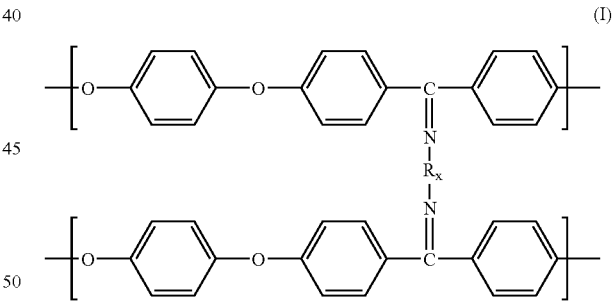

(I)

In formula (I), N—$R_X$—N represents the X group of the generic formula $(P_1)_m$-X-$(P_2)_n$ and $R_X$ is variable as discussed further below. In the example shown in formula (I), each of $P_1$ and $P_2$ has been selected to be polyetheretherketone (PEEK), though other polymers may be used as well. The number of repeating monomeric units of each polymer chain is defined by m and n. In certain examples, m and n may be the same or may be different and, on average, each of m and n may be from 10 to about 1000.

As shown in formula (I), certain embodiments of the cross-linkers disclosed herein are effective to cross-link polymeric chains, such as polyetheretherketone chains, through one or more Schiff base linkages. A Schiff base, also referred to as a substituted imine, is characterized by having at least one carbon-nitrogen double bond with the nitrogen connected to alkyl, aryl or other non-hydrogen substituents. Schiff bases are generally produced by reacting an amino group, typically an amino group of an aromatic amine, with a carbonyl compound. The amine adds to the carbonyl group in a first step, and dehydration through loss of an amine bound proton and addition of a hydrogen to the oxygen results in the formation of the carbon-nitrogen double bond. In some examples, the diamino cross-linkers disclosed herein provide at least two Schiff base linkages after reaction with a polymer. An illustrative reaction to provide a Schiff base linkage is shown in FIG. 1. In this reaction scheme, polyetheretherketone reacts with 4,4'-phenylenediamine in an inert nitrogen atmosphere at 250° C. to provide two Schiff base linkages, one between a first PEEK chain 110 and one between a second PEEK chain 120. These Schiff base linkages join various PEEK chains together resulting in polymerization.

In certain embodiments, many different types of polymers may be used with the cross-linkers disclosed herein. For example, a polyester, a polyether, a polyarylene and the like may be used with the cross-linkers disclosed herein. In some examples, aromatic polymers such as, for example, poly(arylene oxide) (PPO), poly(arylene sulfide) (PPS), poly(arylene ether ketone) (PEK), poly(arylene ether sulfone) (PES), poly(benzazole) (PBX) type of rigid-rod polymers including poly(benzimidazole) (PBI), poly(benzoxazole) (PBO) and poly(benzothiazole) (PBT), poly(diimidazo pyridinylene dihydroxy phenylene) (PIPD, i.e. M5), poly(p-phenylene terephthalamide) (PPTA, i.e. Kevlar), and thermotropic liquid crystalline polyesters may be used. Additional suitable polymers will be readily selected by the person of ordinary skill in the art, given the benefit of this disclosure.

In certain embodiments, after cross-linking, the resulting polymer may have a number average molecular weight from about 6000 Daltons to about 1,000,00 Daltons or more, for example, polymers of number average molecular weight from about 3000 to about 300,000 Daltons as determined by gel permeation chromatography may be used. In some examples, the polymer may have a weight average molecular weight from about 6000 Daltons to about 600,000, particularly those of number average molecular weight from about 3000 to about 300,000 Daltons as determined, for example, by light scattering, small angle neutron scattering (SANS), X-ray scattering, or sedimentation velocity.

It will be recognized by the person of ordinary skill in the art, given the benefit of this disclosure, that the illustrative number average and weight average molecular weights described above are provided merely for illustration. Polymers having molecular weight ranges below or above these illustrative ranges may also be suitable for use with the cross-linkers disclosed herein.

In some examples, the physical properties of the polymer will depend in part upon the molecular weight, whether the polymer is a copolymer or a terpolymer, and in the case of terpolymers the nature of the proportion of the other hydrocarbon present. Desirable melting points for suitable polymers are 175° C. or greater, for example, about 200° C. to about 300° C. A desired viscosity may be selected and determined, for example, using m-cresol at 60° C. in a standard capillary viscosity measuring device. If solubility is an issue, then other solvents including, but not limited to, diphenylsulfone, m-terphenyl, pyrene, fluoranthene, and strong acids including sulfuric acid at around room temperature may be used to dissolve PEEK and/or determine the viscosity. Such dissolution and/or viscosity determination may be performed from about room temperature up to, for example, high temperatures such as those greater than or equal to 200° C.

In certain embodiments, the cross-linkers disclosed may be used to provide a pre-polymer that includes one or more cross-linkers as discussed herein along with a polymer. Certain embodiments of a polymer generally includes a linear alternating aliphatic backbone structure and includes approximately one molecule of carbon monoxide (on average) for each molecule of ethylenically unsaturated hydrocarbon. In addition, the polymer chain may include side chain functionalities such as, for example, aryl groups. In addition, or in the alternative, to those polymers listed herein, particularly suited polymers for use with the cross-linkers described herein include, but are not limited to, those which are copolymers of carbon monoxide and ethylene or terpolymers of carbon monoxide, ethylene and a second ethylenically unsaturated hydrocarbon of three or more carbon atoms such as, for example, an alpha-olefin such as propylene.

In certain examples, one desirable class of polymers includes polyketone polymers and polymers that include two or more ketone groups. Illustrative methods for producing polyketones are described, for example, in U.S. Pat. Nos. 4,808,699 and 4,868,282. In addition, there are many commercially available polyketone polymers suitable for use with the cross-linkers disclosed herein. In some examples, the polyketone polymer may be polyetheretherketone (PEEK). PEEK is a high performance thermoplastic semi-crystalline polymer with high glass transition and melting temperatures ($T_g$=143° C. and $T_m$=334° C.). The scientific name of PEEK is poly(oxy-1,4-phenylene-oxy-1,4-phenylcarbonyl-1,4-phenylene). PEEK has excellent temperature resistance, mechanical properties, and chemical resistance. It is melt processable, and reinforcement of PEEK with fibers or particulate fillers improves properties substantially. PEEK and composite materials based on PEEK are widely used in electrical, automotive, aerospace, oil and gas, and chemical industries. Specifically, the main applications of PEEK in oil and gas industry include electrical cables and insulations, valves, pumps and seals. PEEK may be obtained commercially from numerous sources including, for example, Victrex (West Conshohocken, Pa.), Solvay (Alpharetta, Ga.) and other suppliers.

As a thermoplastic, PEEK material may creep under excessive mechanical load, especially under high temperatures. Introducing cross-links to PEEK materials using one or more of the cross-linkers disclosed herein is an effective method to overcome creeping problem. Methods to crosslink PEEK include ion or electron beam irradiation, elemental sulfur as a cross-linker, and diamine as a cross-linker to crosslink PEEK. In certain embodiments, aromatic diamines or multiamines may be used as cross-linkers because they provide an excellent balance of control over the cross-linking reaction and thermal stability of the cross-linked product.

1,4-Phenylene diamine has been reported to react with carbonyl groups in PEEK and crosslink it via aromatic imines, i.e. Schiff bases (FIG. 1). As discussed above, Schiff bases form short, stiff linkages between PEEK chains. The cross-linked PEEK maintains excellent thermal resistance. The material stiffness becomes less sensitive to temperature after cross-linking. A higher $T_g$ is also observed. Schiff base is susceptible to hydrolysis, especially in acidic or basic fluid and at high temperatures. This affects the long-term durability of the cross-linked PEEK in an oilfield environment.

Certain embodiments provided herein advantageously utilize the cross-linkers disclosed herein to provide a cross-linked PEEK (or other cross-linked polymer) that is durable, for example, in an oilfield environment, is less susceptible to creep under mechanical load and/or at high temperatures. In some embodiments, a diamine having a boiling point of 300°

Figure 5:
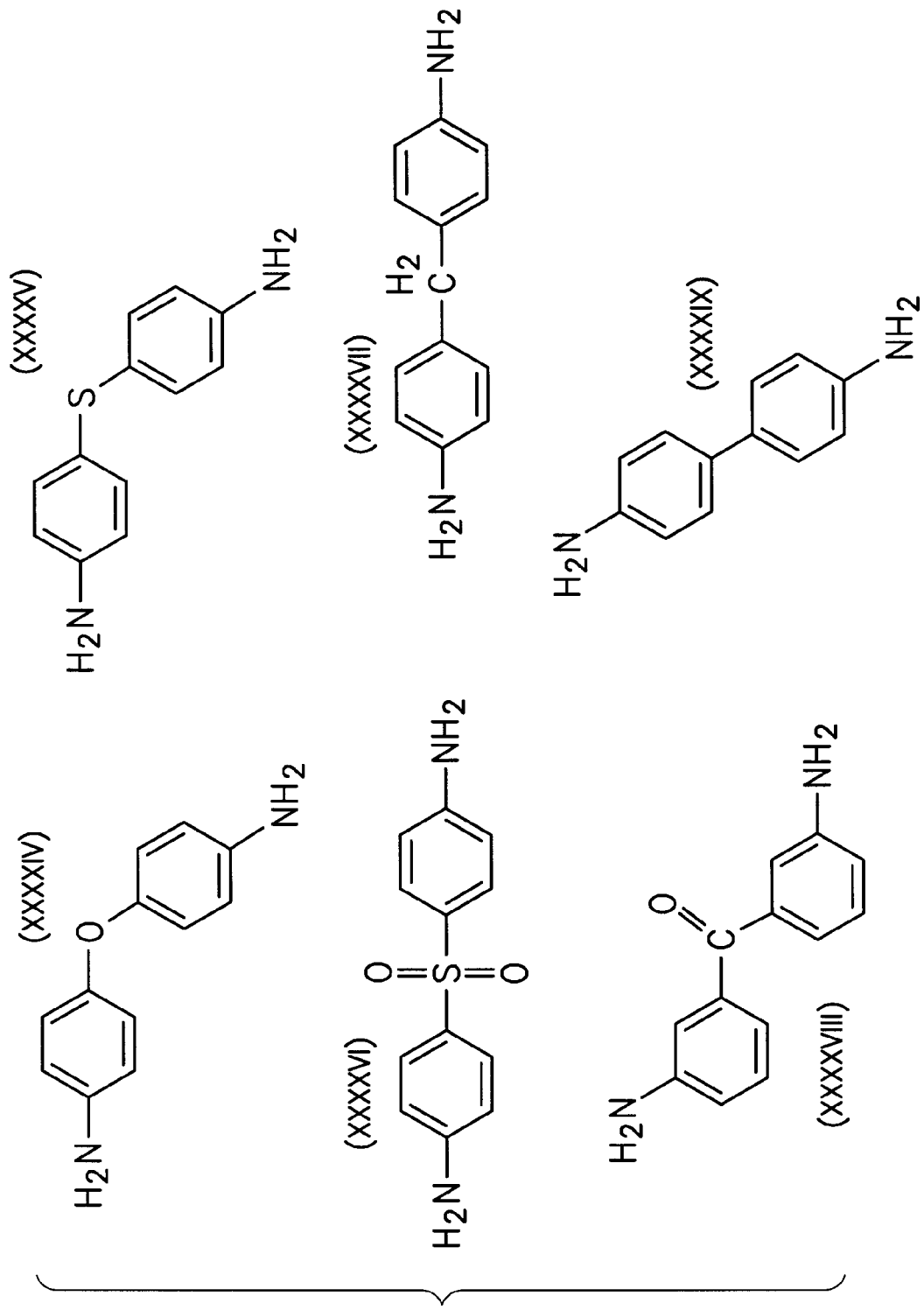
FIG. 5 shows illustrative cross-linkers that may be used to provide a cross-linked polymer, in accordance with certain examples.

C. or more may be used as a cross-linker. In other embodiments, a symmetric or asymmetric diamine, such as the illustrative small molecule diamines described herein, optionally having a boiling point of 300° C. or more, may be used as a cross-linker. In additional embodiments, a substituted or unsubstituted diamine, optionally having a boiling point of 300° C. or more, may be used as a cross-linker. These cross-linkers may be used alone or may be combined with one or more other cross-linkers to provide different types of cross-linking between polymer chains. Illustrative cross-linkers are described herein and shown, for example, in FIGS. 3, 5 and 6. In addition, the boiling points for selected cross-linkers are shown in FIG. 8.

In certain examples, the illustrative cross-linkers described herein may be classified, for convenience purposes only, based on the particular group or groups selected for the X group of the generic $(P_1)_m$-X-$(P_2)_n$ formula. For example, the cross-linkers may be classified into three general categories: (1) a small molecule diamine; (2) a polymeric diamine; and (3) a derivatized structural reinforcing component such as, for example, a derivatized fiber or particle that includes one or more amino groups. Certain examples of each of these illustrative categories of cross-linkers are described in more detail below. While these cross-linkers are referred to in certain instances as diamines, the cross-linkers may also include additional amino groups to provide triamines, tetraamines and other compounds having two or more amino groups. Polymers produced using the illustrative cross-linkers disclosed below may be generally depicted as shown in formula (I) (though the exact composition of the polymer chains may vary) with the amino groups of the polymers forming the Schiff base linkages and the remainder of the cross-linkers being positioned between the amino groups involved in Schiff base formation.

Figure 2:
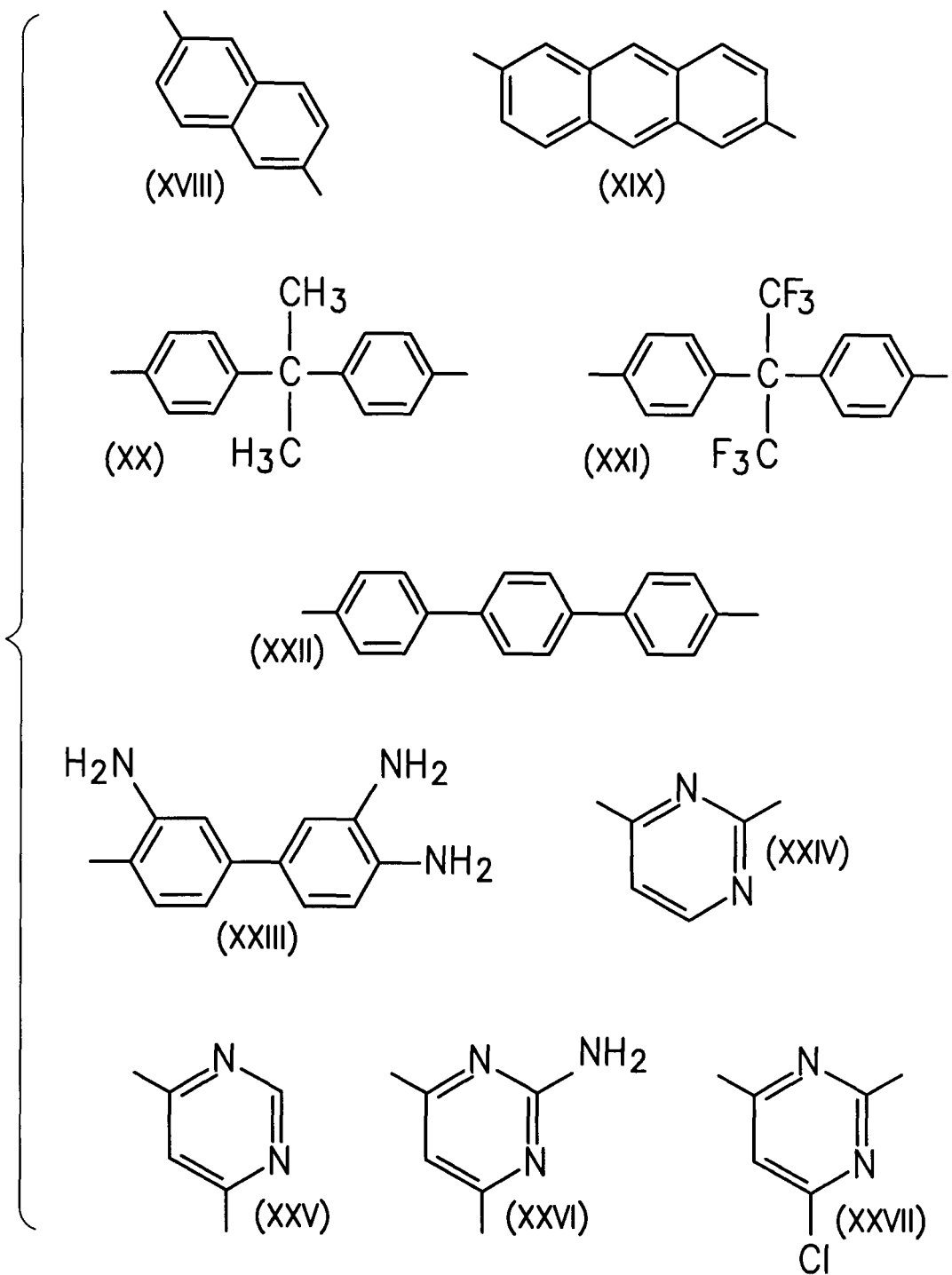
FIG. 2 shows illustrative groups that may be used in the generic polymer formulae provided herein, in accordance with certain examples.

In certain examples, a cross-linker may be selected to provide an $R_X$ group of formula (I) that is one or more of the groups shown, for example, in FIG. 2. To provide such a group for $R_X$ in the generic formula $(P_1)_m$-N—$R_X$—N-$(P_2)_n$, a small molecule cross-linker may be selected and combined with a polymer to provide such generic formula. For example, in certain embodiments, the cross-linker may be configured as small molecule diamine cross-linker having formula (II).

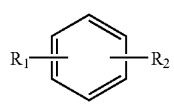

(II)

Figure 3:
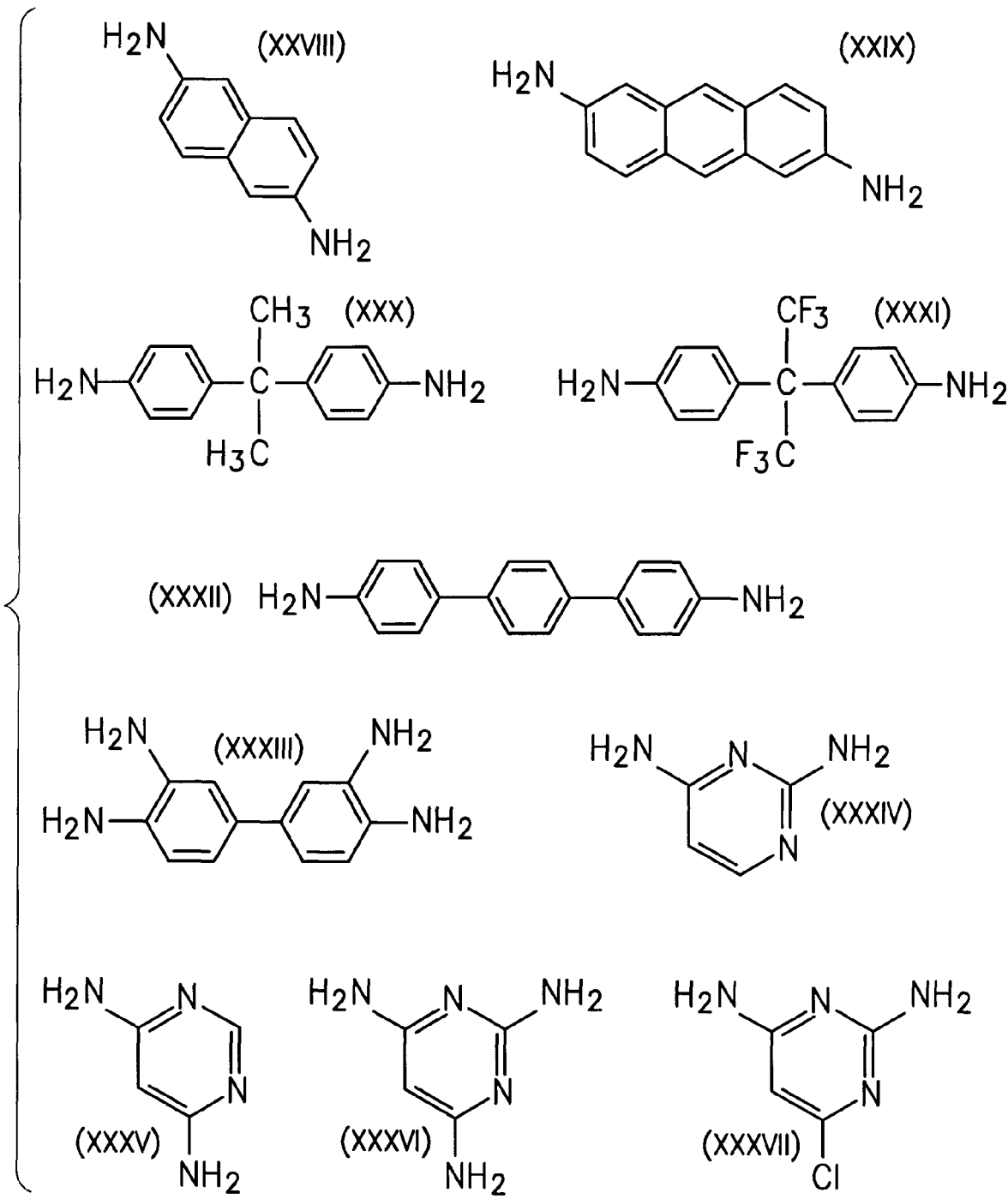
FIG. 3 shows illustrative cross-linkers that may be used to provide a cross-linked polymer, in accordance with certain examples.

In some examples, $R_1$ and $R_2$ are each an amine-containing group, whereas in other examples, $R_1$ may be a group other than amine-containing group and $R_2$ comprises at least two amino functionalities to provide a diamine compound. In certain examples, $R_1$ is —$NH_2$ and $R_2$ is selected to provide an aromatic amine containing group. In certain embodiments, $R_1$ and $R_2$ each include an amino-containing group and suitable additional components to provide an aromatic core structure that may be benzyl, naphthyl, anthracenyl, pyridinyl, pyrimidyl, melaminyl, quinolinyl, furanyl, pyrrolyl, oxazolyl, imidazyl, thiophenyl, triazinyl, benzimidazyl and combinations of them. Illustrative cross-linkers including such core aromatic structures are shown in FIG. 3 as compounds XXVIII-XXXVII. In some examples where each of $R_1$ and $R_2$ are amino groups, the remainder of the positions are hydrogen and each of the polymer chains includes a carbonyl group such as a ketone, to provide a resulting polymer having the general structure shown in FIG. 1.

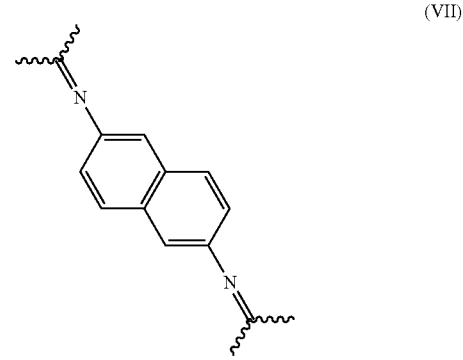

(VII)

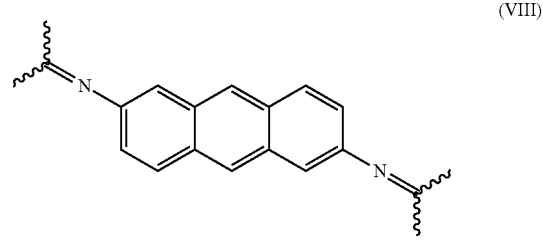

(VIII)

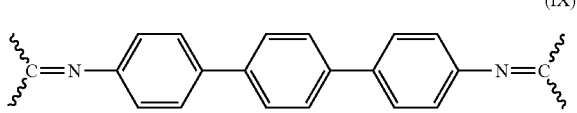

(IX)

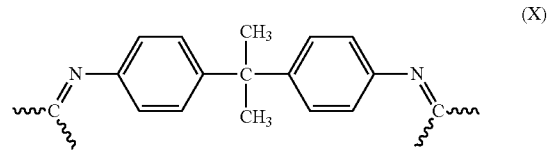

(X)

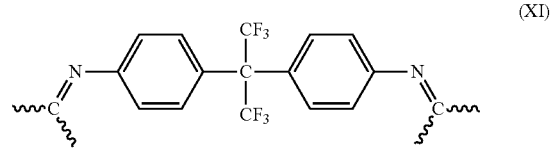

(XI)

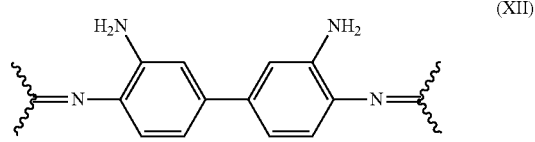

(XII)

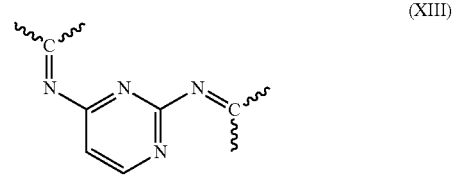

(XIII)

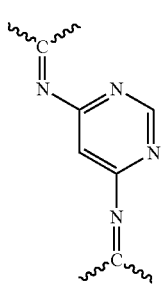

(XV)

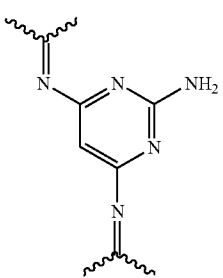

(XVI)

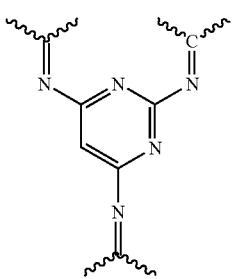

(XVII)

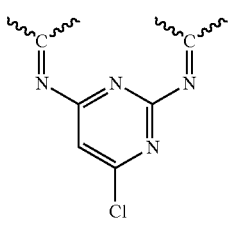

(XIV)

In the polymeric structures shown above, the wavy bonds represent the remainder of the polymer chain, which is omitted for convenience purposes. The resulting cross-linked polymers provided have $R_X$ groups which may be, for example, any of the groups shown in FIG. 2 or other groups that may be provided using small molecule diamine cross-linkers. In addition, those cross-linkers that include more than two amino groups may provide for mixed reaction products, with Schiff base linkage formation provided by different amino groups of the cross-linkers or provided at substantially all free amino groups of the cross-linker.

In certain embodiments, $R_1$ and $R_2$ may be positioned to para- to each other. Para-substituents can provide for more orderly packing of the polymer chains. In other examples, $R_1$ and $R_2$ may be positioned meta- or ortho- to each other. For example, where high crystallinity is not desired, meta- and ortho-cross-linkers may provide cross-linked compounds with suitable properties. In some examples, the remaining positions on the aryl ring of formula (II) may be hydrogen or may be substituted with one or more other groups such as, for example, alkyl groups, hydroxyl groups or other selected groups. In certain examples, the positions of the aryl group which are not $R_1$ or $R_2$ may be, for example, hydrogen, C1-C6 alkyl or may include electron withdrawing groups such as, for example, a halogen, —$NO_2$, —$CF_3$ and the like. In other examples, the positions of the aryl group which are not $R_1$ or $R_2$ may each be hydrogen.

In certain examples, cross-linkers having formula (II) may be selected from those that have a boiling point of 300° C. or more at atmospheric pressure (1 atm). As discussed further below, by selecting cross-linkers whose boiling points are 300° C. or more at atmospheric pressure, the processing temperature may be higher than conventional processing temperatures to provide a polymer having improved properties suitable for use in high temperature and/or high stress environments.

Figure 4:
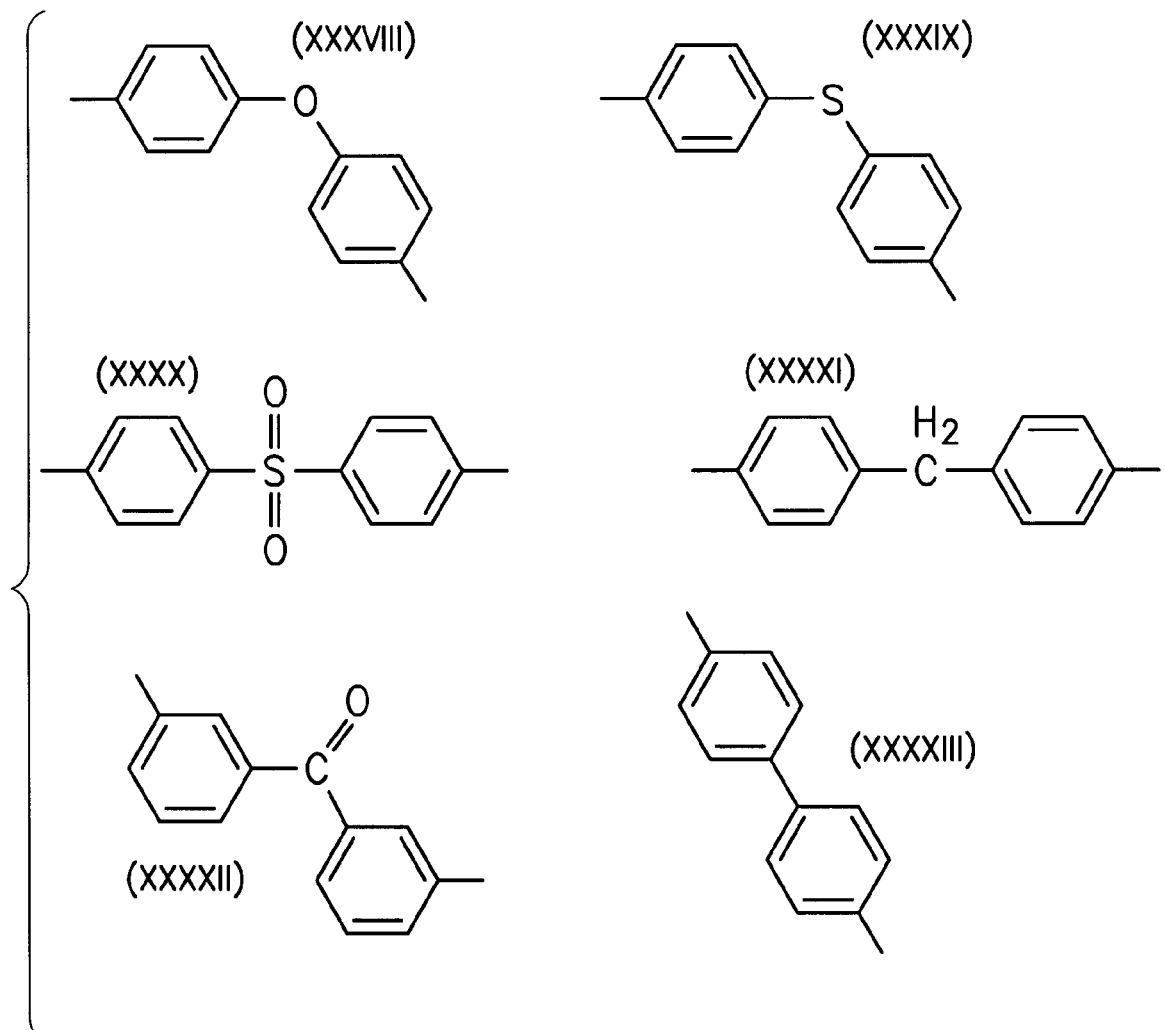
FIG. 4 shows illustrative groups that may be used in the generic polymer formulae provided herein, in accordance with certain examples.

In certain embodiments, a small molecule diamine cross-linker may be selected to provide an $R_X$ group of formula (I) that is one or more of the groups shown, for example, in FIG. 4. To provide such a group for $R_X$ in the generic formula $(P1)_m$-N—$R_X$—N-$(P2)_n$, a small molecule cross-linker may be selected and combined with a polymer to provide such generic formula. For example, in certain embodiments, the cross-linker may be configured as small molecule diamine cross-linker having formula (III).

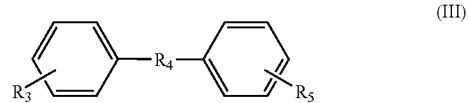

(III)

In certain examples, $R_3$ and $R_5$ may be independently selected such that the compound of formula (III) is a diamine. In some examples, each of $R_3$ and $R_5$ may be —$NH_2$, whereas in other examples $R_3$ may be selected to include at least two amino groups and $R_5$ may be hydrogen, methyl, hydroxyl, methoxy or other non-amino substituents. In certain embodiments, $R_4$ is a bridging group which may or may not be present. That is, in certain embodiments, $R_4$ may be omitted and the two aryl groups may be bound directly to each other or may be fused together to provide a naphthyl based core structure or other higher order structure including two or more fused benzene rings. When $R_4$ is present, $R_4$ may be a carbonyl group, an oxygen atom, a sulfur atom, a sulfonyl group (—$S(O)_2$—), a sulfoxide group (—S(O)—), an alkyl group such as a C1-C6 straight chain (saturated or unsaturated) or branched chain (saturated or unsaturated) group. In embodiments where $R_4$ is an alkyl group, $R_4$ may be, for example, —$CH_2$—, —$CH_2CH_2$—, —$CH_2CH_2CH_2$— or —CH═$CHCH_2$—. Illustrative specific compounds representative of formula (III) are shown in FIG. 4 as compounds XXXVIII-XXXXIII. Where each of $R_3$ and $R_5$ are amino groups and each of the polymer chains is PEEK, a resulting polymer having the following structure, for example, may be produced.

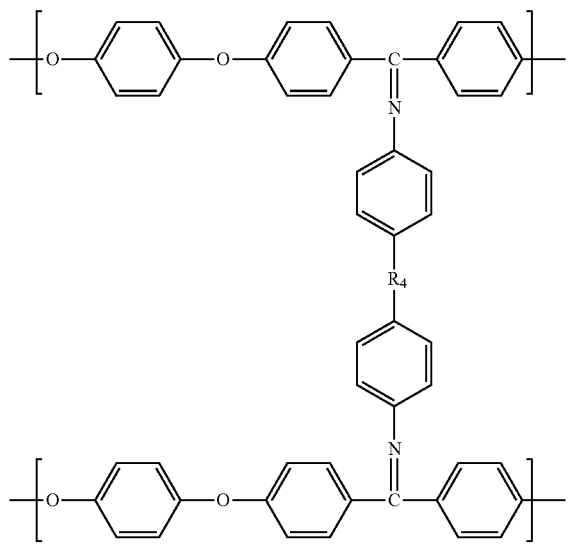

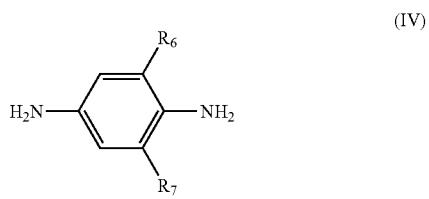

The above structure may vary, depending on the exact position of the $R_3$ and $R_5$ groups on the aryl substituents of formula (III). Similarly, the exact composition may vary depending on the particular group selected for $R_4$ and the particular type of polymer used. Consequently, the above structure is representative of only a single cross-linker within the scope of formula (III), and additional polymeric structures may be produced depending on the exact groups selected for $R_3$, $R_4$, $R_5$ and on the exact type of polymer selected.

In certain examples, cross-linkers having formula (III) may be selected from those that have a boiling point of 300° C. or more at atmospheric pressure (1 atm). As discussed further below, by selecting cross-linkers whose boiling points are 300° C. or more at atmospheric pressure, the processing temperature may be higher than conventional processing temperatures to provide a polymer having improved properties suitable for use in high temperature and/or high stress environments.

In certain embodiments, the groups of the compounds of formulae (II) and (III) may be selected such that a symmetric aromatic diamine is provided. A symmetric aromatic diamine refers to an aromatic diamine whose amino groups have substantially the same reactivity under similar reaction conditions. The symmetric aromatic diamine may include one or more symmetry axes or planes such as, for example, a C2 plane of symmetry, but the term "symmetrical" unless otherwise clear from the context is intended to refer to the reactivity of the amino groups as being substantially the same.

In other examples, the groups of the compounds of formula (II) and (III) may be selected such that an asymmetric aromatic diamine cross-linker is provided. An asymmetric aromatic diamine includes amino groups having different reactivities under similar reaction conditions. Thus, an asymmetric diamine may also include one or more symmetry planes or axes and still be considered an asymmetric diamine based on the differential reactivities of the amino groups. For example, an asymmetric aromatic diamine may have a formula as shown in formula (IV) below.

Figure 6:
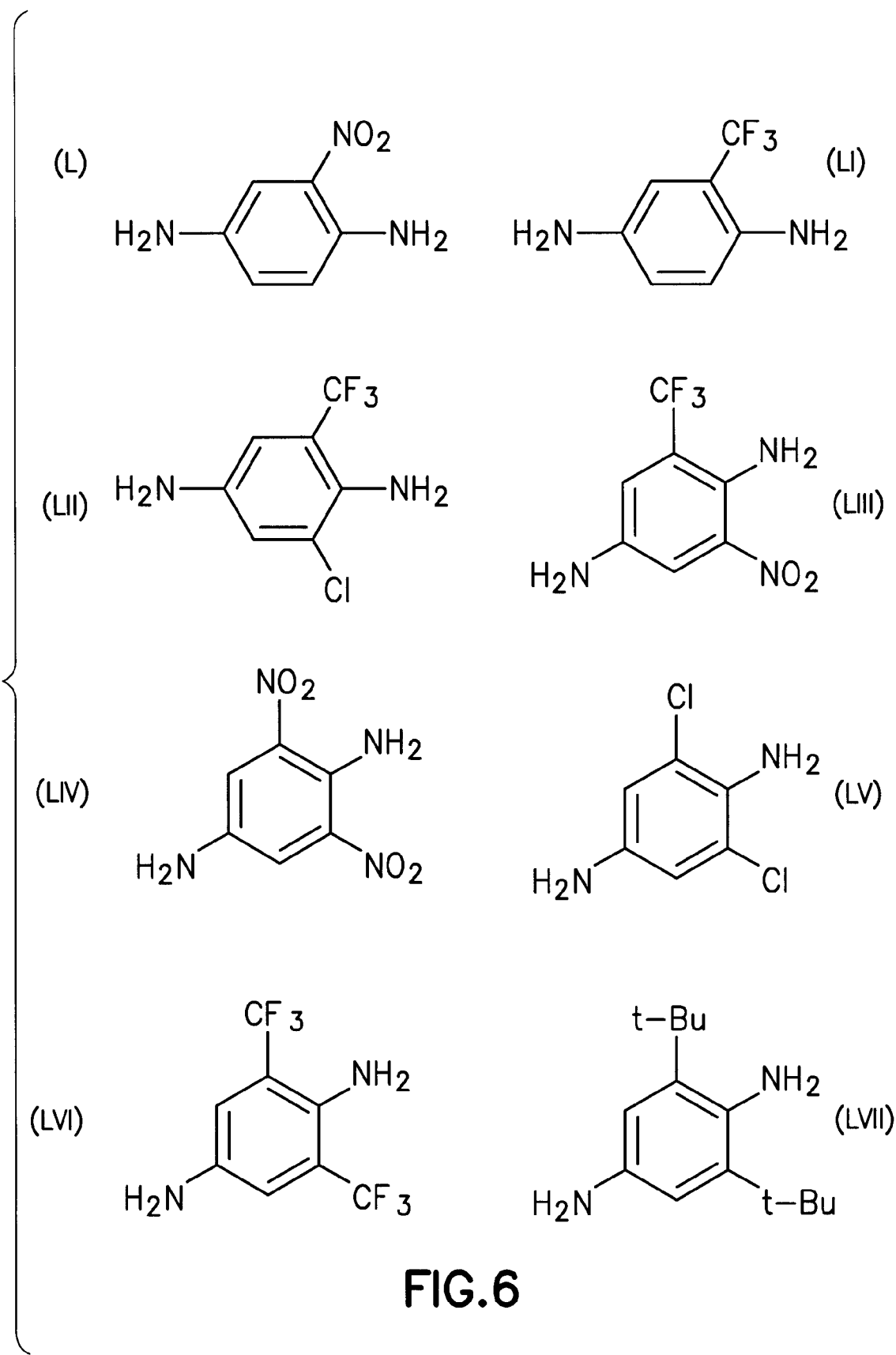
FIG. 6 shows various cross-linkers including asymmetric cross-linkers, in accordance with certain examples.

In some examples, $R_6$ and $R_7$ may be the same or may be different. For example, $R_6$ and $R_7$, may independently be selected from group consisting of hydrogen, —$NO_2$, —$CF_3$, —CN, a halogen, carboxymethyl, alkyl, alkenyl, and alkynyl. Illustrative compounds representative of formula (IV) are shown in FIG. 6 as compounds L-LVII. In a particular embodiment, when $R_6$ and $R_7$, are selected to be electron withdrawing groups (for example, $CF_3$, F, CN, $NO_2$, etc.), the amino group between R6 and R7 has a reduced reactivity, as compared with the other amino group, due to the presence of decreased electron density resulting from the presence of the adjacent electron withdrawing groups. As discussed further below, the processing temperature and resulting polymers can be different depending on whether a symmetric aromatic amine or an asymmetric aromatic amine is selected for use. In addition to the electronic differences noted above, the amino group sandwiched by $R_6$ and $R_7$ can have reduced overall reactivity for steric hindrance reasons, as compared to the amino group that is less sterically hindered. The sterically hindered amino group typically requires higher temperatures to promote formation of a Schiff base linkage. As a result of this differential reactivity, premature cross-linking may be reduced or not occur with the use of cross-linkers having a formula (IV).

In other embodiments, the asymmetric aromatic diamine may have a formula similar to the formula shown in formula (III). For example, an asymmetric aromatic diamine may be a compound having formula (V) shown below.

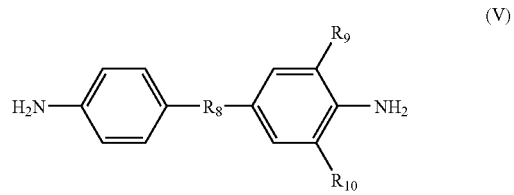

Figure 7:
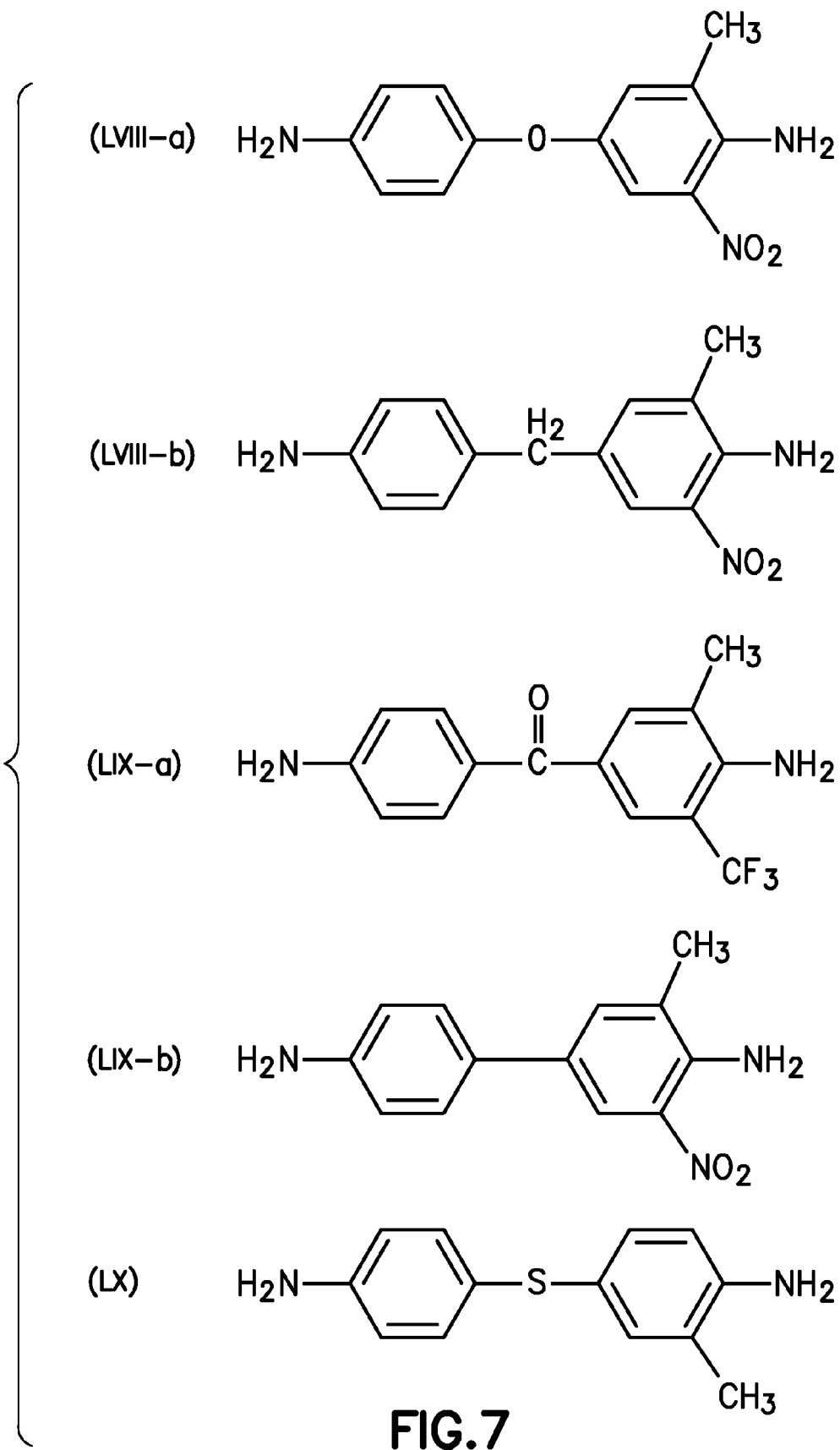
FIG. 7 shows various cross-linkers that may be used to provide a cross-linked polymer, in accordance with certain examples.
Figure 7:
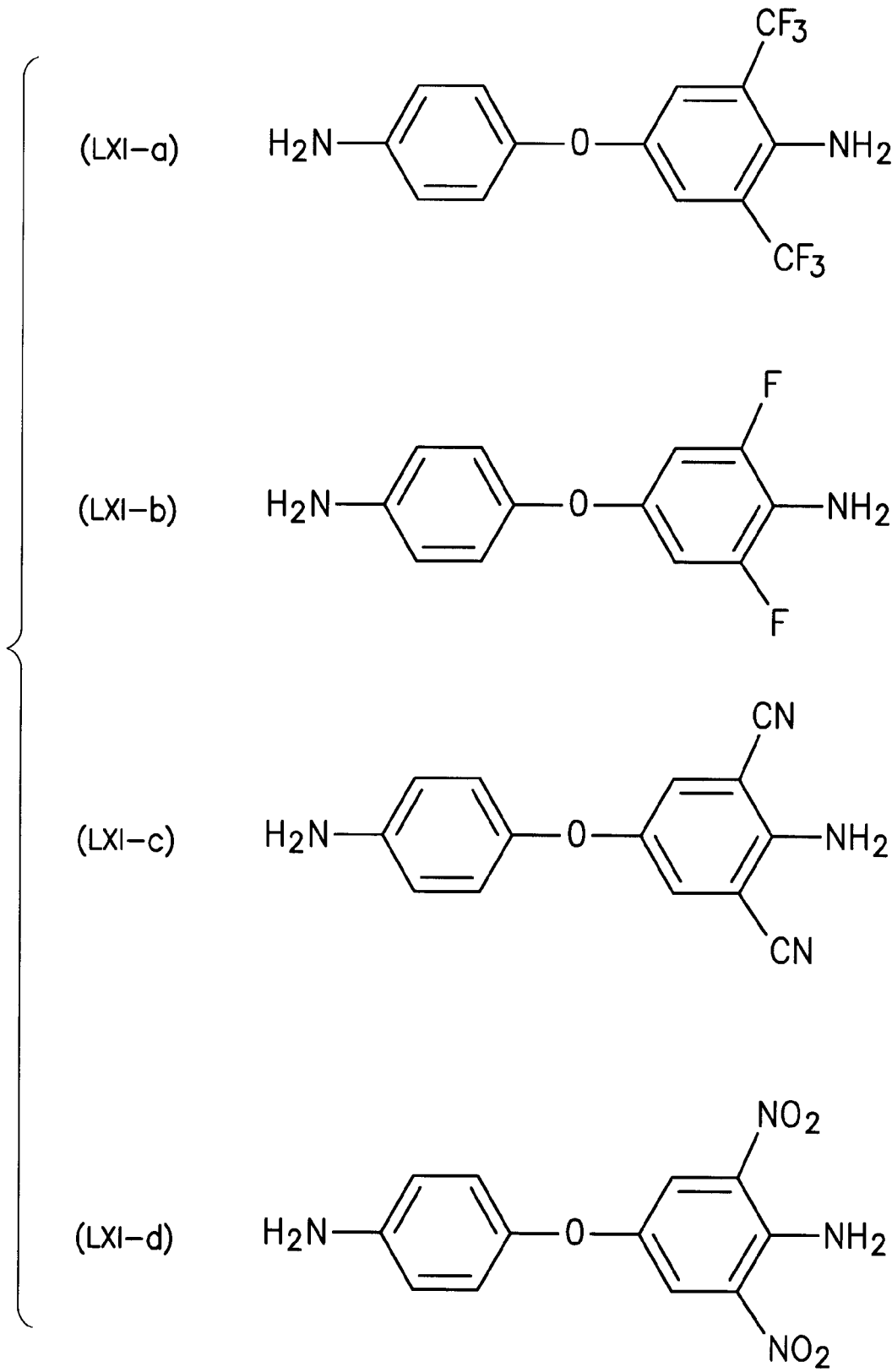
Figure 7:
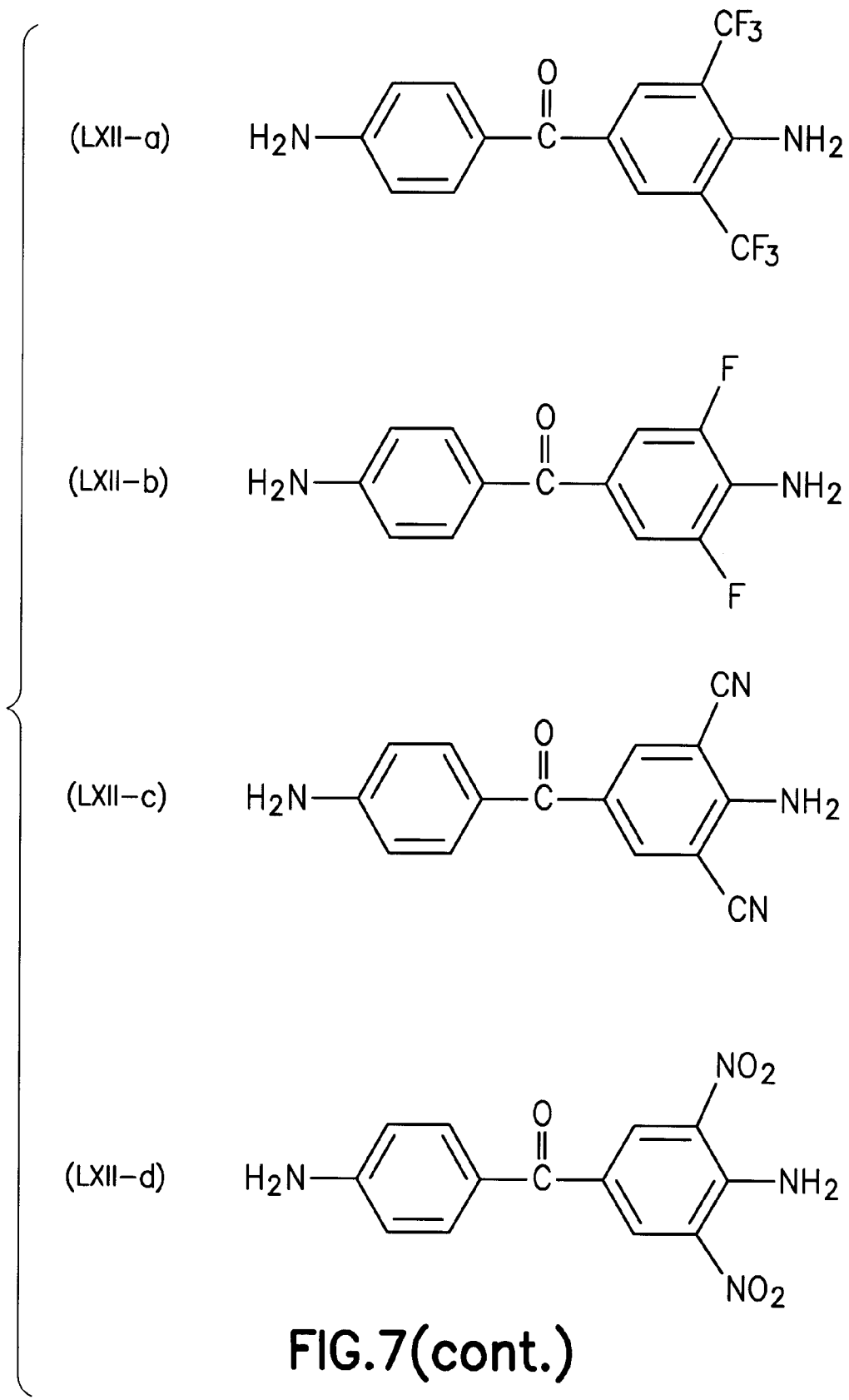

In certain examples, $R_9$ and $R_{10}$ are different such that the overall compound is asymmetric. For example, $R_9$ and $R_{10}$ may independently be selected from the group consisting of hydrogen, —$NO_2$, —$CF_3$, —CN, a halogen, carboxymethyl, alkyl, alkenyl, and alkynyl. In some embodiments, $R_8$ may be absent such that the aryl groups are bonded directly to each other or are fused together to provide a naphthyl or higher ordered fused ring structure. In embodiments where $R_8$ is present, $R_8$ may be a carbonyl group, an oxygen atom, a sulfur atom, a sulfonyl group (—$S(O)_2$—), a sulfoxide group (—S(O)—), an alkyl group such as a C1-C6 straight chain (saturated or unsaturated) or branched chain (saturated or unsaturated) groups. In embodiments where $R_8$ is an alkyl group, $R_8$ may be, for example, —$CH_2$—, —$CH_2CH_2$—, —$CH_2CH_2CH_2$— or —CH=$CHCH_2$—. Illustrative compounds representative of formula (V) are shown in FIG. 7 as compounds LVIII-LXII.

In certain embodiments where an asymmetric diamine of formula (V) is used, the other positions on the aryl rings may independently be occupied by hydrogen, —NO₂, —CF₃, —CN, a halogen, carboxymethyl, alkyl, alkenyl, and alkynyl. In some examples, each of the positions on the aryl rings of formula (V) not bound to $R_9$, $R_{10}$ or an amino functionality may be hydrogen.

In certain embodiments, a cross-linker comprising a derivatized polymer molecule may be used to provide a polymer having desired properties for use, for example, in an oilfield environment. In such instances, the derivatized polymer molecule may be used by itself as a cross-linker or combined with one or more other cross-linkers, such as those shown in formulae (II)-(V). Illustrative derivatized polymers include PEEK derivatized with one or more terminal amino groups, as shown in formula (VI).

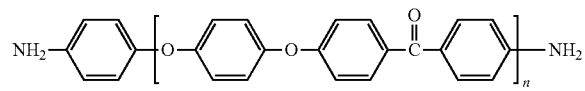

(VI)

In formula (VI), the n value represents the number of monomeric units present in the cross-linker. In certain embodiments, the average value of n may vary from about 10 to about 1000. In some examples it may be desirable to combine the cross-linkers of formula (VI) with PEEK to provide a cross-linked polymer. An advantage of using PEEK with the cross-linkers of formula (VI) is that phase separation is reduced or eliminated, which results in increased mixing of the PEEK molecules and the cross-linkers. Because the backbone of the cross-linkers of formula (VI) is identical to PEEK, the strength of PEEK-cross-linker interactions are almost identical to PEEK-PEEK interactions. When annealing, PEEK molecules may align orderly to form crystalline domains whereas amine end groups of the cross-linkers segregate into the amorphous domains. As a result, the crystallinity of this cross-linked PEEK using the cross-linkers of formula (VI) is expected to be similar to virgin PEEK. In certain examples, PEEK may be derivatized by adding an aminophenol to the PEEK reaction mixture at the final stage of PEEK synthesis.

Figure 9:
FIG. 9 is a schematic of a polymer chain including side chain amino groups, in accordance with certain examples.

In certain embodiments, a derivatized polymer may include one or more amino groups at or on a side chain of the polymer. For example, while the cross-linker of formula (VI) is shown as including terminal amino groups, these terminal amino groups may be replaced, or may be used with, a cross-linker that include at least one amino group on a side chain of a monomeric unit of the cross-linker. In some examples, substantially all monomeric units may include at least one side chain amino group, whereas in other examples, selected, but not all, side chains of monomeric units include at least one amino group. A schematic representation of a di-block polymer with side chain amino groups is shown in FIG. 9. A di-block polymer may be used to provide a balance between crystallinity and cross-linking. For example, one block of the chain may be identical to virgin PEEK and assists in the formation of crystalline domains, whereas the other block with side chain amino groups can provide cross-links to other chains of the polymer.

In certain embodiments, other aromatic oligomers and polymers with end or side chain amino groups may be used as cross-linkers. For example, diamino-functionalized oligomers and polymers found in polyimide industry are readily adaptable for cross-linking PEEK or other polyketone polymers. Other examples are amine-functionalized high performance aromatic polymers such as poly(arylene oxide) (PPO), poly(arylene sulfide) (PPS), poly(arylene ether ketone) (PEK), poly(arylene ether sulfone) (PES), poly(benzazole) (PBX) type of rigid-rod polymers including poly(benzimidazole) (PBI), poly(benzoxazole) (PBO) and poly(benzothiazole) (PBT), poly(diimidazo pyridinylene dihydroxy phenylene) (PIPD, i.e. M5), poly(p-phenylene terephthalamide) (PPTA, i.e. Kevlar), thermotropic liquid crystalline polyesters, and etc. Mixtures of the above species may also be used. In this cross-linker system, PEEK-cross-linker interactions and thermal and chemical resistance of these cross-linkers may be selected to provide desired properties in the final cross-linked product. Such cross-linkers may be used alone or in combination with any one or more of the other cross-linkers disclosed herein.

In certain examples, a fiber, structural reinforcing component or a filler may include at least one amino group that can react with a polymer to provide a Schiff base linkage. In some examples, the fiber, reinforcing component or filler may include two or more amino groups that can be used to cross-link polymeric chains. In such instances, the core structure of the fiber, structural reinforcing component or filler represents the $R_X$ component of the generic $(P_1)_m$-N—$R_X$—N-$(P_2)_n$ formula. For example, when used as a structural material, PEEK is often compounded with reinforcing fibers or particles including carbon fibers, glass fibers, and silica particles. To incorporate cross-links into the composites, the fillers, reinforcing fibers or particles may be derivatized to include one, two or more amino groups and subsequently used as reinforcing crosslinkers. PEEK molecules can attach covalently to the fiber or particle surface via imine formation so that the PEEK chains are cross-linked to the filler. In addition, the filler can effectively transfer load exerted on the polymer so that it reinforces the PEEK material. Because of the covalent bonding at the interface, strong polymer-filler interfacial strength is likely to be achieved, which can provide favorable mechanical properties particularly in an oil field services environment.

Figure 10A:
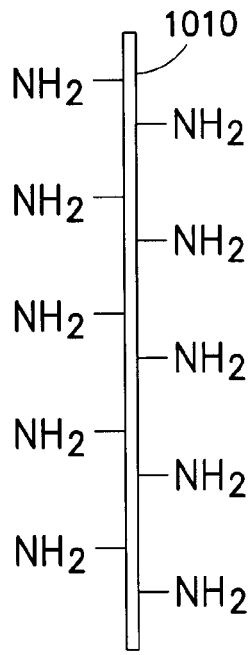
FIG. 10A is a schematic of a derivatized fiber including at least one amino group.
Figure 10B:
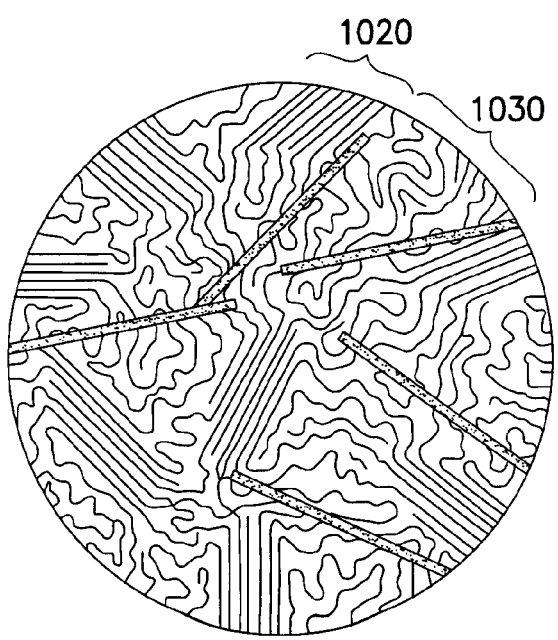
FIG. 10B is a drawing showing various domains of a polymer, in accordance with certain examples.

A schematic representation of PEEK reinforced with an amine-modified reinforcing fiber is shown in FIGS. 10A and 10B. The fiber 1010 includes two domains or regions—a region of high crystallinity 1020 and an amorphous region 1030. The presence of two domains may provide advantages for structural applications due to the co-existence of crystalline domains with reinforcing fibers covalently cross-linked/bounded to the amorphous domains. The amine-derivatized fibers or particles may be selected such that they have a boiling point of 300° C. or greater. The exact amount of derivatized particles and/or fillers used may vary depending on the desired properties of the resulting polymer. In certain examples, about 50 to about 100 parts per hundred (phr) of derivatized filler is combined with the polymer prior to cross-linking of the polymer.

In certain embodiments, the resulting polymers produced using the cross-linkers disclosed herein may have an increased number of amorphous domains. In some examples, the total free volume within the polymer can increase. Thus, more void space may be present within the polymer network In certain examples, the polymers disclosed herein may have a broader working temperature range than existing polymers used, for example, in down-hole applications in the oil field services industry. A desirable temperature range is about −50° C. to about 350° C. For example, when compared with virgin PEEK, the polymers may have a glass transition temperature, a melting temperature, and/or a β-transition temperature range that is broader than virgin PEEK. Such increased temperature ranges extend the lifetime and can increase the number of potential applications using the polymers disclosed herein. Illustrative methods of determining glass transition temperatures are described, for example, in ASTM E1356-03. Methods for determining melting temperatures include, but are not limited to, calorimetry and differential scanning calorimetry. Methods for determining a β-transition temperature include, but are not limited to, dynamic mechanical thermal analysis (DMTA) and dynamic mechanical analysis (DMA).

In certain embodiments, a method comprising combining a polymer and at least one cross-linker having formulae (I)-(V) and a boiling point of 300° C. or more, and processing the combined polymer and cross-linker at a processing temperature to permit cross-linking of the polymer through formation of at least two Schiff base linkages between polymer chains of the polymer and the cross-linker is provided. The cross-linker may be any of the illustrative cross-linkers disclosed herein or other suitable cross-linkers falling within the scope of the generic formulae (II)-(V). In certain embodiments, the method may further comprise selecting the cross-linker as a derivatized PEEK comprising two terminal amino groups. In some examples, the method may further comprise selecting the cross-linker as a derivatized PEEK comprising two side chain amino groups. In other examples, the method may further comprise selecting the cross-linker as a derivatized fiber comprising at least two amino groups or as a derivatized particle comprising at least two amino groups. In some examples, the method may further comprise comprising configuring the polymer with at least two polyetheretherketone chains cross-linked through the at least two Schiff base linkages.

In certain embodiments, the polymers disclosed herein may be prepared by combining one or more selected cross-linkers with one or more selected polymers. Several variables may affect the properties of the resulting cross-linked polymer including, but not limited to: mixing temperature and time, molding and annealing temperature, pressure and time, curing temperature and time and any post-cure annealing temperature, pressure and time that may occur. In certain examples, the particular processing parameters may be selected based on the intended end use of the polymer. For example, in structural applications, a high crystallinity grade polymer such as, for example, a high crystallinity grade PEEK, may be used as the polymer. In some examples, the cross-linker reactivity is selected to be low enough so that there is no substantial cross-linking in the mixing stage, but is high enough so that the curing time is manageable within an industrial setting. The polymer, prior to cross-linking, may be annealed at a relatively low temperature (for example, about 200 to about 280° C.) and high load conditions so that crystallization can be completed before substantial cross-linking occurs. During this stage, the cross-linkers may segregate into the amorphous domains. It is also desirable to decrease curing time under a high curing temperature to minimize thermal degradation of the polymer.

In some examples, post-cure annealing may also be used to remove any defects caused in curing stage, and this annealing may be performed in a similar fashion as pre-cure annealing. For example, the annealing may occur during a solidification step through control of the cooling rate. In some examples, the annealing may be carried out in line during the extrusion step by using a controlled cooling rate. Alternatively, or in addition, the annealing step may be performed in a subsequent step after the article has been solidified and collected. In the latter case, the solidified article can be placed in an oven or transported through a heating zone for a period of time sufficient to affect crystallization. In some examples, the article may be annealed at a temperature from about 150-350° C., for example, a temperature of about 200-300° C., may be used in the annealing process.

In embodiments where the cross-linked polymer may be used for elastomeric applications, crystallinity is less critical than in structural applications. Accordingly cheaper amorphous grades of PEEK may be used and annealing may be omitted. In addition, plasticizers may be used to lower the glass transition temperature ($T_g$) and modulus if desired. The polymer is desirably cured within a short time period to minimize thermal degradation.

In certain embodiments, the combination of a polymer and a cross-linker may be melt-processed or melt-blended. In a typical melt blending operation, the polymer and the cross-linker are combined and heated until the polymer softens and/or melts and the cross-linker melts. The melted polymer may then react with the cross-linker to provide a resulting cross-linked polymer composition. Unlike many existing melt processes, which use temperatures at 250° C. or below, certain embodiments of the cross-linkers disclosed herein permit higher melt processing temperatures, such as those between 250-400° C. or even around 400° C. or greater. In addition, by using cross-linkers having sterically hindered groups and/or high boiling points, a higher level of control for the cross-linking is provided as substantially no, or no, cross-linking may occur prior to complete melting of the polymer. In some examples, cross-linking may not substantially occur at temperatures below about 300° C., whereas cross-linking may be promoted by exceeding about 300° C. for at least some period. Illustrative methods of melt processing and other processed for producing polymers may be found, for example, in *Principles of Polymer Processing* by Zehav Tadmor and Costas G. Gogos, 2006, pages 448-472 amd 523-532.

In some examples, the resulting cross-linked polymer may be cooled and/or shaped to provide a desired configuration. For example, the cross-linked polymer may be extruded, casted or introduced into a mold to provide a desired final shape. In some examples, the cross-linked polymer may take the form of a flat sheet film, a fiber, a hollow fiber or other desired article shape by melt extrusion, casting or molding. In most instances, the final shape and/or configuration of the article depends, at least in part, on the intended use and/or intended use environment.

In certain examples where the solubility of the cross-linker in the polymer is lower than desired, a phase transfer agent such as, for example, an alcohol, polyol or other desired agent may be added to increase the availability of the cross-linker for reaction with the polymer. Additional suitable phase transfer agents will be readily selected by the person of ordinary skill in the art, given the benefit of this disclosure.

In addition to the process controls, which can limit the degree of cross-linking, there are other variables that can affect the degree of cross-linking in the resulting polymer. For example, the grade of polymer (for example, semi-crystalline or amorphous PEEK) and their blends may affect the degree of cross-linking. In some examples, the solubility of the cross-linker in the polymer can affect the overall amount of cross-linking. In other examples, the particular groups selected for the cross-linker may affect the reactivity of the cross-linker. In other examples, the cross-linking density may affect the overall polymeric structure and/or properties. In certain examples, removal of water during the cross-linking can favor Schiff base formation and/or disfavor hydrolysis of the Schiff base linkages. In embodiments where a derivatized filler, fiber or particle is used, the properties of the core structure can affect the degree of cross-linking and the properties of the resulting cross-linked polymer. It will be within the ability of the person of ordinary skill in the art, given the benefit of this disclosure to adjust or select these and other parameters to provide cross-linked polymers having desired properties.

In some examples, the resulting cross-linked polymer may be subjected to one or more additional processing steps, prior to solidification, during solidification and/or after solidification. For example, the cross-linked polymer may be calendered, coated, molded, cast, extruded, spin coated, brushed, painted or otherwise disposed on or in a desired surface of device for further processing.

In producing the polymers, suitable devices such as, for example mixers, mills, grinders and the like may be used to mix and/or blend the various components used in the polymer composition. For example, a Henschel™ high speed mixer or other low shear devices including, hand mixing, mechanical stirring, magnetic stirring, etc., may be used to mix the polymer and the cross-linker. In embodiments where an extruder is used, a polymer/cross-linker blend may be fed into the throat of a twin-screw extruder via a hopper. Alternatively, one or more of the components may be incorporated into the composition by feeding directly into the extruder at the throat and/or downstream through a side port. Desired additives such as fillers, colorants and the like may also be compounded into a master-batch and fed into the extruder. The extruder may be operated at a temperature higher than that necessary to cause the composition to melt or stay melted. The extrudate may be quenched in a water batch and pelletized. Such pellets may be used for subsequent molding, shaping, or forming.

In certain embodiments, one or more additional materials may be incorporated into the resulting cross-linked composition to provide, for example, desired physical traits and/or physical properties. For example, an impact modifier, may be used, and illustrative impact modifiers include, but are not limited to, those comprising one of elastomeric materials such as rubbers. For example, natural rubber, acrylic rubber, ASA rubber, diene rubber, organosiloxane rubber, ethylene propylene diene monomer (EPDM) rubber, styrene-butadiene-styrene (SBS) rubber, styrene-ethylene-butadiene-styrene (SEBS) rubber, acrylonitrile-butadiene-styrene (ABS) rubber, methacrylate-butadiene-styrene (MBS) rubber, styrene acrylonitrile copolymer and glycidyl ester impact modifiers may be used. In some examples, an elastomer or an elastomeric material may be added to the resulting polymer.

In certain embodiments, it may be desirable to include a radiation stabilizer in the resulting cross-linked polymer composition. Such radiation stabilizers may be useful, for example, where the part has an intended use environment where X-rays or gamma rays may be encountered such as, for example, in certain medical applications and in aerospace applications. Illustrative radiation stabilizers include, but are not limited to, diols, such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol and 1,4-hexanediol. In some examples, the radiation stabilizer may be an alicyclic alcohols such as 1,2-cyclopentanediol and 1,2-cyclohexanediol, a branched acyclic diols such as 2,3-dimethyl-2,3-butanediol (pinacol), and polyols, as well as an alkoxy-substituted cyclic or acyclic alkane. In other examples, an alkenol, with sites of unsaturation, may also be used, examples of which include 4-methyl-4-penten-2-ol, 3-methyl-pentene-3-ol, 2-methyl-4-penten-2-ol, 2,4-dimethyl-4-pene-2-ol, and 9-decen-1-ol. In additional examples, a tertiary alcohol having at least one hydroxy substituted tertiary carbon may be used. Examples of tertiary alcohols include, but are not limited to, 2-methyl-2,4-pentanediol(hexylene glycol), 2-phenyl-2-butanol, 3-hydroxy-3-methyl-2-butanone and 2-phenyl-2-butanol, and cycloaliphatic tertiary carbons such as 1-hydroxy-1-methyl-cyclohexane. In yet other examples, a hydroxymethyl aromatic, which has a hydroxy substitution on a saturated carbon attached to an unsaturated carbon in an aromatic ring, may be used as a radiation stabilizer. The hydroxy substituted saturated carbon may be a methylol group ($-CH_2OH$) or it may be a member of a more complex hydrocarbon group. Specific hydroxy methyl aromatics include, but are not limited to, benzhydrol, 1,3-benzenedimethanol, benzyl alcohol, 4-benzyloxy benzyl alcohol and benzyl benzyl alcohol. Specific alcohols are 2-methyl-2,4-pentanediol (also known as hexylene glycol), polyethylene glycol, polypropylene glycol.

In certain embodiments, articles produced using the compositions may also include reinforcing wires such as rebar, may include conductive electrodes or cabling such that a current can be passed from one side of the article to another side, may include suitable fittings or ports to permit physical and/or electrical connections or may include additional mechanical features depending on the intended use of the articles. It will be within the ability of the person of ordinary skill in the art, given the benefit of this disclosure, to select suitable components to include in articles produced using the cross-linked compositions disclosed herein.

In certain embodiments, the cross-linked compositions disclosed herein are particularly suited for use in down-hole oilfield applications. In down-hole applications, a device, such as an analytical instrument, may be lowered into a wellbore where it may be exposed to a substantial range of pressures, temperatures and different chemicals. The down-hole device may include one or more surfaces such as, for example, the surfaces of a housing containing the analytical instrument, that are exposed to the environment in the wellbore. For example, a gas chromatograph, a liquid chromatograph, a mass spectrometer or nuclear magnetic resonance device may be placed down-hole and used for analytical measurements. In some examples, the surface (or substantially all surfaces) of the housing may comprise polyketone chains cross-linked to each other through a $N-R_X-N$ group, wherein one of the nitrogen groups of the $N-R_X-N$ group is bound to a carbon of a first polyketone chain through a first carbon-nitrogen double bond and the other nitrogen of the $N-R_X-N$ group is bound to a carbon of a second polyketone chain through a second carbon-nitrogen double bond, and wherein the $N-R_X-N$ group is provided from a cross-linker having formulae (II)-(V). In certain examples, the surface may be present on or in, an electrical pad, a cable, a feed-through, a valve, a pump, a seal, an o-ring or other components of devices commonly used down-hole in exploration and extraction of petroleum and natural gases. It will be within the ability of the person of ordinary skill in the art, given the benefit of this disclosure, to use the cross-linked polymer described herein in devices and components used in down-hole applications.

Certain specific examples are described in more detail below to illustrate further some of the novel and non-obvious features of the technology described herein.

EXAMPLE 1

PEEK Properties

Table 2 shows the mechanical properties of virgin PEEK. PEEK loses mechanical properties significantly above glass transition temperature.

TABLE 2

Mechanical properties of virgin PEEK

| Property | Value |
|---|---|
| Flexural Modulus (GPa) | |
| 23° C. | 3.7 |
| 100° C. | 3.6 |
| 200° C. | 0.5 |
| 200° C. | 0.3 |
| Tensile Strength (MPa) | |
| 23° C. | 92 |
| 100° C. | 50 |
| 200° C. | 12 |
| 200° C. | 10 |
| Elongation at Break (%) | 50 |
| Shear Strength (MPa) | 93 |
| Compressive Strength (MPa) | 120 |
| Izod Impact Strength (J/m) | |
| Unnotched | No break |
| Notched 0.25 mm rad | 83 |
| Cycles to Failure, at 23° C. | |
| 75 MPa | $10^7$ |
| 80 MPa | $10^3$ |
| 100 MPa | $10^2$ |
| 110 MPa | $10^1$ |

Figure 11:
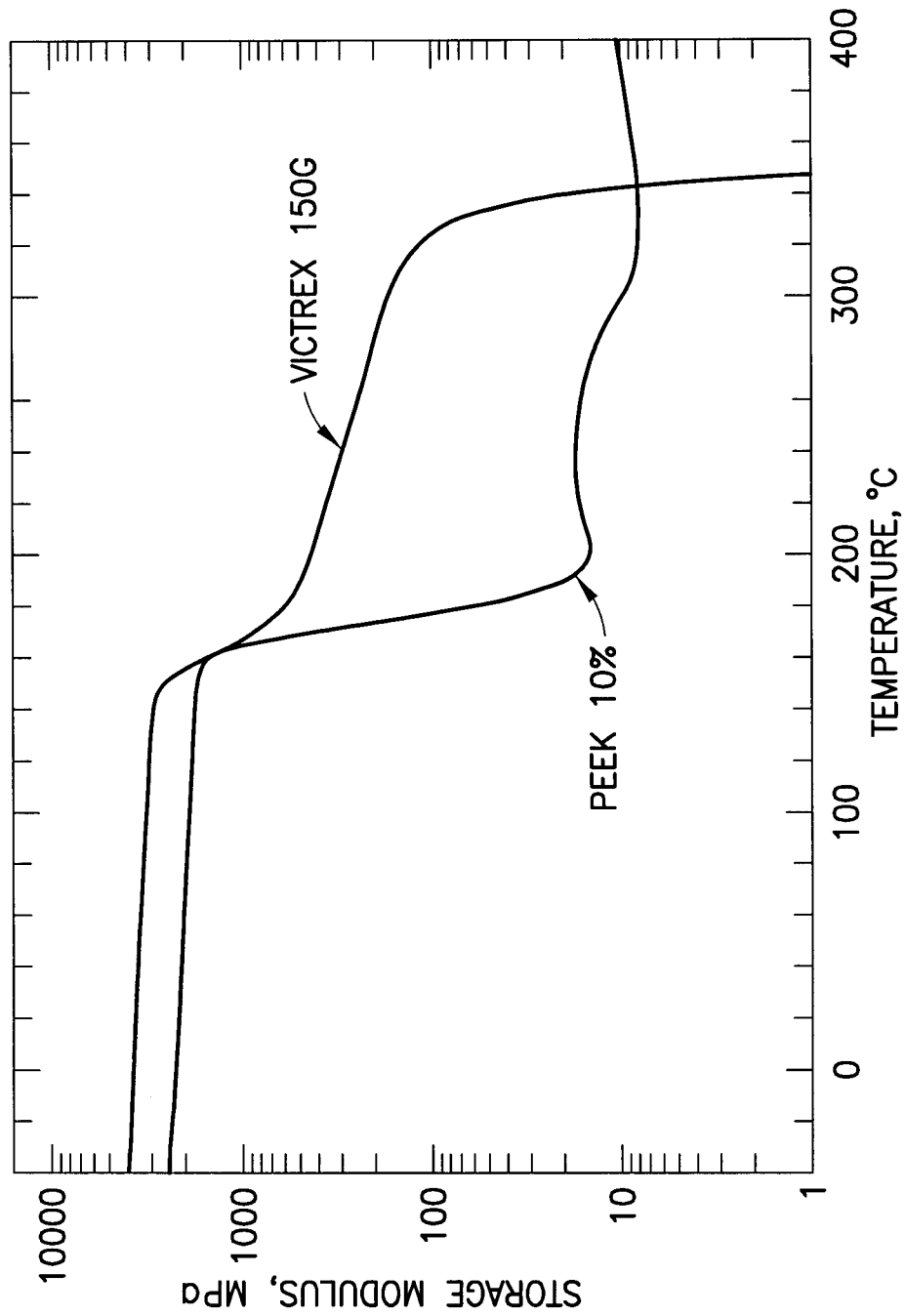
FIG. 11 is a graph showing the effect of cross-linking on polymer properties, in accordance with certain examples.

Cross-linking of PEEK using the cross-linkers and methods described herein may be used to reduce the effect of temperature on PEEK properties. The storage modulus of virgin PEEK (Victrex 150G) and cross-linked PEEK (10% carbonyl groups are cross-linked) is shown in FIG. 11.

The cross-linked PEEK was prepared as follows: 151G PEEK (from Victrex) 1,4-diphenylamine (from Alfa Aesar) and diphenyl sulfone (97%) (from Sigma-Aldrich) were used without purification. 10 grams of PEEK, 200 grams of diphenyl sulfone and 1.45 grams of 1,4,-diphenylamine were placed in a 500 mL three neck round bottom flask. The flask was placed under a continuous nitrogen purge. The mixture was then quickly heated to approximately 300-320° C. with vigorous stirring. When the temperature of the mixture reached 260° C., the nitrogen purge was discontinued. Because the boiling point of 1,4-phenylene diamine is 267° C., caution was taken not to purge the system extensively at temperatures above 260° C. to avoid the loss of the diamine cross-linking agent. As soon as the PEEK material dissolved, the reaction mixture was cooled to 250-260° C. and maintained at this temperature for 3 hours with stirring. After every hour of reaction, the system was purged with nitrogen for a short period of time (10 minutes) to rid the system of the by-product water vapor. After 3 hours, the hot mixture was poured onto a glass dish, forming a solid. That solid was broken into small pieces, ground and placed into a round bottom flask with acetone and stirred overnight. In addition the mixture was sonicated for 1 hour to dissolve unreacted phenylene diamine and diphenyl sulfone. Upon completion of the first extraction, the suspension in acetone was filtered on a vacuum filter. This purification procedure was repeated two more times, or to the point where the supernatant acetone solution exhibited no color and IR spectroscopy revealed an absence of diphenyl sulfone in the product. After purification the product was dried on a vacuum filter, and then heated in a vacuum oven at 100° C. overnight. The resulting product was recovered quantitatively as greenish or yellowish powder. All modified PEEK polymer powders were hot-pressed by Carver 4120 hydraulic press at 343° C. and post-cured at 250° C. for 4 hours. This procedure provided films approximately 0.3-0.5 mm thick, from which specimens for tensile and exposure testing were cut out. The cross-linked PEEK shows a rubbery plateau over a much larger temperature range, and the storage modulus was virtually constant above 200° C.

A complementary method to reduce the temperature dependence of PEEK properties around $T_g$ is to compound PEEK with reinforcing fillers, although it is not the focus of the current embodiment. It has been well accepted that carbon fiber improves greatly the creep resistant of PEEK at elevated temperatures (around and above $T_g$).

EXAMPLE 2

$T_g$ and β-Transition Temperature and their Effects on Application Temperatures In an oilfield environment, it is expected that PEEK materials may be exposed to a broad temperature (including operational and non-operational temperatures), ranging from −50° C. to 350° C. depending on the geo-location or depth of the well. A desirable characteristic of the cross-linked polymers disclosed herein is that they posses a broad application temperature range.

The application temperature range of PEEK is dependent not only on glass transition ($T_g$) and melting temperatures but also the β-transition temperature. Melting temperature ($T_m$) of PEEK, around 334° C., is related to the size of crystalline domain. Larger crystals usually have a higher $T_m$. Since the variation in crystalline domain size is very limited in PEEK systems, only very small differences of PEEK melting points should be observed. Although $T_m$ cannot be altered significantly, a variety of techniques may be used to control the crystallinity of PEEK, including annealing or quenching, and introducing chemical groups (such as —$SO_2$— groups or —$C(CH_3)_2$— groups) to the PEEK skeletal chain to inhibit crystallization, etc. By combining modifications in chemical structure and materials processing, crystallinity may be substantially removed, and semi-crystalline PEEK may be converted into an amorphous PEEK if desired.

Glass transition and β-transition temperatures can be varied to a larger extent. Glass transition of polymers is also called α-transition or α-relaxation, which notes it is the primary relaxation mechanism of polymers. Above $T_g$ and below $T_m$ (for semi-crystalline material) or $T_f$ (flow temperature, for completely amorphous material), a glassy material becomes rubbery. The molecular origin of glass transition is commonly believed to be the large-scale segmental motion of polymers. The $T_g$ of PEEK is about 143° C., and the activation energy of glass transition of PEEK is about 1070-1900 kJ/mol (Victrex 450G semi-crystalline and amorphous PEEK, DMA data, 0.1 Hz).

The sub-glass secondary relaxation is called β-transition or β-relaxation. The β-relaxation of PEEK is bi-modal, comprising a lower-temperature ($β_1$) component, which originates from the local intra-chain motions in the bulk of the amorphous material, and a higher-temperature ($β_2$) component, which originates from cooperative local chain alignment and arrangement in organized regions of the amorphous phase (i.e. at the crystal-amorphous inter-phase). The temperature range associated with β-relaxation is very broad, from −100° C. to about 50° C. Empirically, β-transition is believed to correlate with the toughness or ductility of polymers, and it is often called brittle-ductile transition for that reason. Below a certain temperature close to the lower bound of $T_β$ (around −65° C.), PEEK becomes brittle. PEEK is a tough polymer at room temperature, with elongation at break to be 50% (Table 2). This property is expected if it is assumed that the motions responsible for the β-relaxation are able to combine to yield longer range reorganization.

EXAMPLE 3

Using the knowledge of glass transition and β-transition temperatures, the following methods may be used to modulate (mainly decrease) $T_g$ and $T_\beta$ so as to broaden the application temperature range of PEEK.

Functional plasticizers may be added to the cross-linked PEEK before cross-linking. Such functional plasticizers may be small aromatic molecules, which may have a structure similar to the cross-linkers disclosed herein without any amino groups. In some examples, the plasticizer may be oligomers or short chains of PEEK itself. In other examples, nano-particles such as, for example, clay, silica, carbon black, carbon nanotubes, polysilsesquioxane (POSS), etc, and their organic derivatives (e.g., organic molecule modified nano-particles), may be used as plasticizers.

In other examples, the transition temperatures of the PEEK may be modified by performing structural modifications to the PEEK molecule. For example, if a lower glass transition temperature is desired, the molecular weight of the PEEK may be decreased. In some examples, a PEEK with a flexible backbone may be used when lower $T_g$ and $T_\beta$ are desired. A flexible pendant group may be attached to the PEEK to lower the $T_g$ and $T_\beta$. Illustrative pendant groups include, but are not limited to, —$OCF_3$, —$OCF_2CF_3$, and —O-phenyl. In other examples, the cross-linking density of PEEK may be decreased to provide a lower $T_g$. In certain examples, the PEEK chain may be branched to decrease $T_g$ and $T_\beta$.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A polymer comprising a plurality of polyetheretherketone chains, wherein at least a first and a second polyetheretherketone chain are cross-linked to each other through a N—$R_X$—N group, wherein one of the nitrogen groups of the N—$R_X$—N group is bound to a carbon of the first polyetheretherketone chain through a first carbon-nitrogen double bond and the other nitrogen of the N—$R_X$—N group is bound to a carbon of the second polyetheretherketone chain through a second carbon-nitrogen double bond, and wherein the N—$R_X$—N group is provided from a cross-linker having formulae (II)-(V);
wherein the $R_x$ group is a compound having formulae (XVIII)-(XXVII) or (XXXVIII)-(XXXXIII); and
further comprising a cross-linker that is a derivatized PEEK comprising at least two side chain amino groups.

2. A polymer comprising a plurality of polyetheretherketone chains, wherein at least a first and a second polyetheretherketone chain are cross-linked to each other through a N—$R_X$—N group, wherein one of the nitrogen groups of the N—$R_X$—N group is bound to a carbon of the first polyetheretherketone chain through a first carbon-nitrogen double bond and the other nitrogen of the N—$R_X$—N group is bound to a carbon of the second polyetheretherketone chain through a second carbon-nitrogen double bond, and wherein the N—$R_X$—N group is provided from a cross-linker having formulae (II)-(VI);
wherein the $R_x$ group is a compound having formulae (XVIII)-(XXVII) or (XXXVIII)-(XXXXIII); and
further comprising a cross-linker that is a derivatized fiber comprising at least two amino groups or a derivatized particle comprising at least two amino groups.

3. The polymer of claim 1, in which at least one of the plurality of polyetheretherketone chains is cross-linked to an additional polymer chain through a Schiff base linkage.

4. A polymer comprising a formula of $(P_1)_m$—N—$R_X$—N—$(P_2)_n$, wherein $P_1$ and $P_2$ are each polymeric chains comprising a carbonly group, wherein m and n may independently vary from about 10 to about 1000, wherein one of the nitrogen groups of the N—$R_X$—N group is bound to a carbon of the $P_1$ polymeric chain through a first carbon-nitrogen double bond and the other nitrogen of the N—$R_X$—N group is bound to a carbon of the $P_2$ polymeric chain through a second carbon-nitrogen double bond, and wherein the N—$R_X$—N group is provided from a cross-linker having formulae (II)-(V);
wherein the $R_x$ group is a compound having formulae (XVIII)-(XXVII) or (XXXVIII) -(XXXXIII); and further comprising a cross-linker that is a derivatized PEEK comprising at least two side chain amino groups.

5. The polymer of claim 4, in which each of $P_1$ and $P_2$ are each a polyketone polymer.

6. The polymer of claim 5, in which the polyketone polymer is polyetheretherketone.

7. A polymer comprising a formula of $(P_1)_m$—N—$R_X$—N—$(P_2)_n$, wherein $P_1$ and $P_2$ are each polymeric chains comprising a carbonyl group, wherein m and n may independently vary from about 10 to about 1000, wherein one of the nitrogen groups of the N—$R_X$—N group is bound to a carbon of the $P_1$ polymeric chain through a first carbon-nitrogen double bond and the other nitrogen of the N—$R_X$—N group is bound to a carbon of the $P_2$ polymeric chain through a second carbon-nitrogen double bond, and wherein the N—$R_X$—N group is provided from a cross-linker having formulae (II)-(V);
wherein the $R_x$ group is a compound having formulae (XVIII)-(XXVII) or (XXXVIII) -(XXXXIII); and further comprising a cross-linker that is a derivatized fiber comprising at least two amino groups or a derivated particle comprising at least two amino groups.

8. A down-hole device comprising a surface exposed to an oilfield environment, the surface comprising cross-linked polyketone chains cross-linked to each other through a N—$R_X$—N group, wherein one of the nitrogen groups of the N—$R_X$—N group, is bound to a carbon of a first polyketone chain through a first carbon-nitrogen double bond and the other nitrogen of the N—$R_X$—N group is bound to a carbon of a second polyketone chain through a second carbon-nitrogen double bond, and wherein the N—$R_X$—N group is provided from a cross-linker having formulae (II)-(V);
wherein the $R_x$ group is a compound having formulae (XVIII)-(XXVII) or (XXXVIII) -(XXXXIII); and
wherein the N—$R_X$—N group is provided b a cross-linker that is a derivatized PEEK comprising at least two side chain amino groups.

9. The down-hole device of claim 8, in which the device is an electrical pad, a cable, a feed-through connector, a housing of an electrical or chemical device, a valve, a pump, a seal or an o-ring.

10. The down-hole device of claim 9, in which the electrical or chemical device is a gas chromatograph, a liquid chromatograph, a mass spectrometer, a nuclear magnetic resonance device, a resistivity scanner or a formation imager.

* * * * *